US00RE51133E

(19) United States
(12) Reissued Patent
Liu et al.

(10) Patent Number: US RE51,133 E
(45) Date of Reissued Patent: Nov. 24, 2026

(54) DISPLAY METHOD AND APPARATUS

(71) Applicant: HUAWEI TECHNOLOGIES CO., LTD., Shenzhen (CN)

(72) Inventors: Lin Liu, Beijing (CN); Dengkui Zhu, Shenzhen (CN)

(73) Assignee: HUAWEI TECHNOLOGIES CO., LTD., Shenzhen (CN)

(21) Appl. No.: 17/585,357

(22) Filed: Jan. 26, 2022

Related U.S. Patent Documents

Reissue of:
(64) Patent No.: 11,003,277
Issued: May 11, 2021
Appl. No.: 16/641,085
PCT Filed: Aug. 23, 2017
PCT No.: PCT/CN2017/098683
§ 371 (c)(1),
(2) Date: Feb. 21, 2020
PCT Pub. No.: WO2019/036942
PCT Pub. Date: Feb. 28, 2019

(51) Int. Cl.
*G06F 3/041* (2006.01)
*G06F 3/14* (2006.01)

(52) U.S. Cl.
CPC ..... *G06F 3/0416* (2013.01); *G06F 3/1423* (2013.01)

(58) Field of Classification Search
CPC .... G06F 3/1423; G06F 3/0416; G06F 3/1454; G06F 3/14; G06F 3/041
See application file for complete search history.

(56) References Cited

U.S. PATENT DOCUMENTS 9,122,444 B2 9/2015 Findlay et al.
9,591,278 B2 3/2017 Wu et al.
2006/0232610 A1 10/2006 Lee et al.
2013/0067331 A1 3/2013 Glazer et al.
2013/0148545 A1* 6/2013 Jung ..... H04W 52/0251 370/255

(Continued)

FOREIGN PATENT DOCUMENTS

CN 103000015 A 3/2013
CN 103150132 A 6/2013

(Continued)

OTHER PUBLICATIONS

Wi-Fi DisplayTechnical Specification Version 1.1, Wi-Fi Alliance,dated 2012,total 151 pages.

*Primary Examiner* — Dennis G Bonshock
(74) *Attorney, Agent, or Firm* — WOMBLE BOND DICKINSON (US) LLP

(57) ABSTRACT

A display method and apparatus are disclosed. The method includes: joining, by a first device, a device group, where the device group includes N devices, any two devices in the N devices can communicate with each other, and N≥2; receiving, by the first device, a first selection operation entered by a user, where the first selection operation is used to trigger the first device to communicate with a second device in the device group; sending, by the first device, a first screen projection request to the second device in response to the first selection operation, where the first screen projection request is used to request to project a display interface of the second device onto a display screen of the first device; receiving display data in the display interface of the second device that is sent by the second device; and displaying based on the display data.

21 Claims, 14 Drawing Sheets

(56) References Cited

U.S. PATENT DOCUMENTS

| | | | | |
|---|---|---|---|---|
| 2014/0009394 | A1 | 1/2014 | Lee et al. | |
| 2014/0201551 | A1* | 7/2014 | Imai | G06F 1/3206 713/323 |
| 2015/0061970 | A1* | 3/2015 | Kim | G06F 3/1423 345/2.3 |
| 2015/0304484 | A1* | 10/2015 | Halmstad | H04W 48/02 455/419 |
| 2016/0195860 | A1 | 7/2016 | Ni | |
| 2016/0210105 | A1* | 7/2016 | Ru | H04L 67/16 |
| 2016/0239250 | A1* | 8/2016 | Kim | G06F 3/1454 |
| 2017/0010849 | A1 | 1/2017 | Deng et al. | |
| 2017/0131962 | A1* | 5/2017 | Lee | G06F 3/1454 |
| 2017/0230461 | A1* | 8/2017 | Verma | H04L 69/16 |
| 2017/0245174 | A1* | 8/2017 | Jung | H04L 67/131 |
| 2017/0311025 | A1* | 10/2017 | Kim | G06F 3/1454 |
| 2019/0265780 | A1* | 8/2019 | Kim | G06F 1/1686 |

FOREIGN PATENT DOCUMENTS

| | | | |
|---|---|---|---|
| CN | 103777603 | A | 5/2014 |
| CN | 104780433 | A | 7/2015 |
| CN | 104918131 | A | 9/2015 |
| CN | 104951080 | A | 9/2015 |
| CN | 105094732 | A | 11/2015 |
| CN | 105897547 | A | 8/2016 |
| CN | 106598524 | A | 4/2017 |
| EP | 2849053 | A2 | 3/2015 |
| KR | 20160016335 | A | 2/2016 |
| KR | 1020160016335 | A | 2/2016 |
| WO | 2015127835 | A1 | 9/2015 |

* cited by examiner

DISPLAY METHOD AND APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a Reissue Application of U.S. patent application Ser. No. 16/641,085, filed on Feb. 21, 2020, now U.S. Pat. No. 11,003,277, which is a National Stage of International Patent Application No. PCT/CN2017/098683, filed on Aug. 23, 2017. Both of the aforementioned applications are hereby incorporated by reference in their entireties.*

TECHNICAL FIELD

Embodiments of this application relate to the field of communications technologies, and in particular, to a display method and apparatus.

BACKGROUND

With rapid development of communications technologies, a screen projection function has been widely applied to daily life of users. For example, a user may install screen projection software on a mobile phone, and project, for display, screen source data such as a photo and a video on the mobile phone onto a controlled device (for example, a smart television) that supports the screen projection function, to help the user view, on different devices, related screen source data on a same device.

In a current screen projection method, the user needs to initiate a screen projection operation on a device that provides screen source data, to send the screen source data to a projected device for display. However, in some application scenarios, the user may not have at hand the device that provides the screen source data, or the user cannot quickly find the device that provides the screen source data. For example, the user expects to project a video played on a mobile phone onto a smart television with a larger display in a bedroom for watching. However, the mobile phone may not be in the bedroom at this time, and the user cannot quickly and conveniently implement a function of projection from the mobile phone to the smart television.

SUMMARY

Embodiments of this application provide a display method and apparatus, to resolve a problem that a user cannot quickly and conveniently use a screen projection function when it is inconvenient to obtain a device that provides screen source data, thereby improving efficiency of collaboration between a plurality of devices and improving using experience of the user.

To achieve the foregoing objective, the following technical solutions are used in the embodiments of this application.

According to a first aspect, an embodiment of this application provides a display method. The method includes: A first device joins a device group, where the device group includes N devices, any two devices in the N devices can communicate with each other, and N≥2; the first device receives a first selection operation entered by a user, where the first selection operation is used to trigger the first device to communicate with a second device in the device group; then, the first device may send a first screen projection request to the second device in response to the first selection operation, where the first screen projection request is used to request to project a display interface of the second device onto a display screen of the first device; subsequently, the first device may receive display data in the display interface of the second device that is sent by the second device; and further, the first device displays the display interface of the second device on the display screen of the first device based on the display data.

In other words, any device (for example, the first device) joining the device group may actively invite another device (for example, the second device) to project a display interface of the another device onto the display screen of the first device. In this way, even if the second device is out of an operation range of the user, the user can view the display interface of the second device by using the first device. In addition, the user may use any device in the device group as a controlling device based on an actual requirement, select another device in the device group as a controlled device, and project a display interface of the controlled device onto a display screen of the controlling device, to implement a function of screen projection between any two devices in the device group.

In one embodiment, after the first device joins the device group, the method further includes: The first device obtains an identifier of the second device, to establish a trust relationship with the second device. The trust relationship is used to indicate that communication is allowed between two devices that each store an identifier of the other device, so that the first device subsequently sends a screen projection request to another device that has established a trust relationship with the first device in the device group, so as to manage a running status of the another device.

In one embodiment, that the first device obtains an identifier of the second device includes: the first device sends a first probe message to X devices in the device group, where the first probe message is used to indicate that the first device joins the device group, the X devices include the second device, and 1≤X≤N; the first device receives a first trust request sent by Y devices in the device group, where the first trust request is used to request to establish a trust relationship with the first device, the first trust request carries an identifier of a device that sends the first trust request, the Y devices include the second device, and 1≤Y≤X; the first device displays a device list of the Y devices; and the first device stores the identifier of the second device when receiving a second selection operation for selecting the second device from the device list by the user, to establish the trust relationship with the second device.

In one embodiment, that the first device obtains an identifier of the second device includes: the first device sends a second trust request to X devices in the device group, where the second trust request is used to request to establish a trust relationship with a device that receives the second trust request, the X devices include the second device, and 1≤X≤N; the first device receives a trust response sent by Y devices in the device group, where the trust response carries an identifier of a device that sends the trust response, the Y devices include the second device, and 1≤Y≤X; and the first device stores the identifier of the second device, to establish the trust relationship with the second device.

In one embodiment, the first trust request further carries a screen projection parameter of the second device, and the screen projection parameter is used to indicate a screen projection capability of the second device when the second device performs a screen projection function.

In one embodiment, the second trust request further carries a screen projection parameter of the first device, and the screen projection parameter is used to indicate a screen projection capability of the first device when the first device performs a screen projection function.

In a subsequent screen projection process, the first device may select, based on a screen projection parameter of the second device, a proper screen projection method to display the display data sent by the second device.

In one embodiment, the first device sends a second probe message to at least one device in the device group before the first device enters a sleeping state, where the second probe message is used to probe whether a device in the device group has a screen projection requirement; and if receiving a probe response sent by at least one device, the first device keeps, after entering the sleeping state, a service process used to receive the first screen projection request.

In one embodiment, before the second device enters a sleeping state, the first device receives a second probe message sent by the second device, where the second probe message is used to probe whether a device in the device group has a screen projection requirement; and the first device sends a probe response to the second device when the first device has the screen projection requirement.

In other words, when another device (for example, the second device) is in a sleeping state, the first device may still send a screen projection request to the second device, to project the display interface of the second device onto the first device, so that the user can manage a running status of the second device by using the first device.

In one embodiment, before the first device receives the first selection operation entered by the user, the first device sends a third probe message to X devices in the device group, where the third probe message is used to probe whether a device that receives the third probe message keeps a service process used to receive a screen projection request, and $1 \leq X \leq N$; and if receiving a probe response sent by Y devices, the first device displays a device list of the Y devices, where $1 \leq Y \leq X$.

In one embodiment, the first device receives a second screen projection request sent by the second device, where the second screen projection request is used to request to project a display interface of the first device onto a display screen of the second device; and the first device sends display data in the display interface of the first device to the second device, so that the second device displays the display interface of the first device on the display screen of the second device based on the display data.

In one embodiment, the device group includes the second device, and that a first device joins a device group includes: The first device accesses a same Wi-Fi network with the second device; or the first device accesses a same local area network with the second device; or the first device accesses the Internet with the second device.

In one embodiment, the display data in the display interface of the second device includes display data of a last frame before the second device enters the sleeping state; or the display data in the display interface of the second device includes display data in a display interface currently displayed by the second device; or the display data in the display interface of the second device includes display data in a display interface preset by the second device.

In one embodiment, after the first device displays the display interface of the second device on the display screen of the first device based on the display data, the first device receives an operation event triggered for the display interface of the second device by the user on the display screen of the first device; and the first device sends an operation instruction associated with the operation event to the second device, so that the second device executes the operation instruction. In other words, the controlling device (namely, the first device) may further manage the running status of the controlled device (namely, the second device) in the projected display interface, and in a management process, a function of a device may be implemented on another device without depending on an APP of a managed device, so that efficiency of collaboration between a plurality of devices in a device interconnection scenario is increased, and using experience of the user can be improved.

In one embodiment, after the first device sends the operation instruction associated with the operation event to the second device, the first device receives a voice signal sent by the second device; and the first device plays a corresponding voice based on the voice signal, so that the user can implement, on the first device, a call function provided by the second device.

In one embodiment, the operation instruction includes: coordinate information of the operation event on the display screen of the second device, or coordinate information of the operation event on the display screen of the first device and a coordinate mapping relationship between the display screen of the first device and the display screen of the second device.

According to a second aspect, an embodiment of this application provides a display device, including a processor, a memory, a display, a transceiver, and an input device that are connected by using a bus. The processor is configured to enable the device to join a device group, where the device group includes N devices, any two devices in the N devices can communicate with each other, and $N \geq 2$. The input device is configured to receive a first selection operation entered by a user, where the first selection operation is used to trigger the device to communicate with another device in the device group. The transceiver is configured to: send a first screen projection request to the another device, where the first screen projection request is used to request to project a display interface of the another device onto a display screen of the device; and receive display data in the display interface of the another device that is sent by the another device. The display is configured to display the display interface of the another device on the display screen of the device based on the display data.

In one embodiment, the transceiver is further configured to obtain an identifier of the another device, to establish a trust relationship with the another device.

In one embodiment, the transceiver is configured to: send a first probe message to X devices in the device group, where the first probe message is used to indicate that the device joins the device group, the X devices include the another device, and $1 \leq X \leq N$; receive a first trust request sent by Y devices in the device group, where the first trust request is used to request to establish a trust relationship with the device, the first trust request carries an identifier of a device that sends the first trust request, the Y devices include the another device, and $1 \leq Y \leq X$; the display is further configured to display a device list of the Y devices; the input device is further configured to receive a second selection operation for selecting the another device from the device list by the user;

and the memory is configured to store the identifier of the another device, to establish the trust relationship with the another device.

In one embodiment, the transceiver is configured to: send a second trust request to X devices in the device group, where the second trust request is used to request to establish a trust relationship with a device that receives the second trust request, the X devices include the another device, and $1 \leq X \leq N$; and receive a trust response sent by Y devices in the device group, where the trust response carries an identifier of a device that sends the trust response, the Y devices include the another device, and $1 \leq Y \leq X$; and the memory is configured to store the identifier of the another device, to establish the trust relationship with the another device.

In one embodiment, the transceiver is further configured to: send a second probe message to at least one device in the device group before the device enters a sleeping state, where the second probe message is used to probe whether a device in the device group has a screen projection requirement; and receive a probe response sent by at least one device; and the processor is further configured to: after the device enters the sleeping state, keep a service process used to receive the first screen projection request.

In one embodiment, the transceiver is further configured to: before the another device enters a sleeping state, receive a second probe message sent by the another device, where the second probe message is used to probe whether a device in the device group has a screen projection requirement; and send a probe response to the another device when the device has the screen projection requirement.

In one embodiment, the transceiver is further configured to: send a third probe message to X devices in the device group, where the third probe message is used to probe whether a device that receives the third probe message keeps a service process used to receive a screen projection request, and $1 \leq X \leq N$; and receive a probe response sent by Y devices, where $1 \leq Y \leq X$; and the display is further configured to display a device list of the Y devices.

In one embodiment, the transceiver is further configured to: receive a second screen projection request sent by the another device, where the second screen projection request is used to request to project a display interface of the device onto a display screen of the another device; and send display data in the display interface of the device to the another device, so that the another device displays the display interface of the device on the display screen of the another device based on the display data.

In one embodiment, the transceiver is configured to enable the device to: access a same Wi-Fi network with the another device; or access a same local area network with the another device; or access the Internet with the another device.

In one embodiment, the input device is further configured to receive an operation event triggered for the display interface of the another device by the user on the display screen of the device; and the transceiver is further configured to send an operation instruction associated with the operation event to the another device, so that the another device executes the operation instruction.

In one embodiment, the transceiver is further configured to receive a voice signal sent by the another device; and the processor is further configured to play a corresponding voice based on the voice signal.

According to a third aspect, an embodiment of this application provides a display device, including a processor, a memory, a bus, and a transceiver. The memory is configured to store a computer-executable instruction. The processor is connected to the memory by using the bus. When the display device runs, the processor executes the computer-executable instruction stored in the memory, to enable the display device to perform any one of the foregoing display methods.

According to a fourth aspect, an embodiment of this application provides a computer-readable storage medium. The computer-readable storage medium stores an instruction, and when the instruction is run on any one of the foregoing display devices, the display device is enabled to perform any one of the foregoing display methods.

According to a fifth aspect, an embodiment of this application provides a computer program product including an instruction. When the computer program product is run on any one of the foregoing display devices, the display device is enabled to perform any one of the foregoing display methods.

In the embodiments of this application, names of the foregoing display devices do not constitute any limitation on the devices. In an actual implementation, the devices may have other names. All devices with functions similar to those in the embodiments of this application fall within the scope of the claims of this application and equivalent technologies of this application.

In addition, for technical effects brought by any design method in the second aspect to the fifth aspect, refer to technical effects brought by different design methods in the foregoing first aspect. Details are not described herein.

DESCRIPTION OF EMBODIMENTS

The terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more than two.

Figure 1:
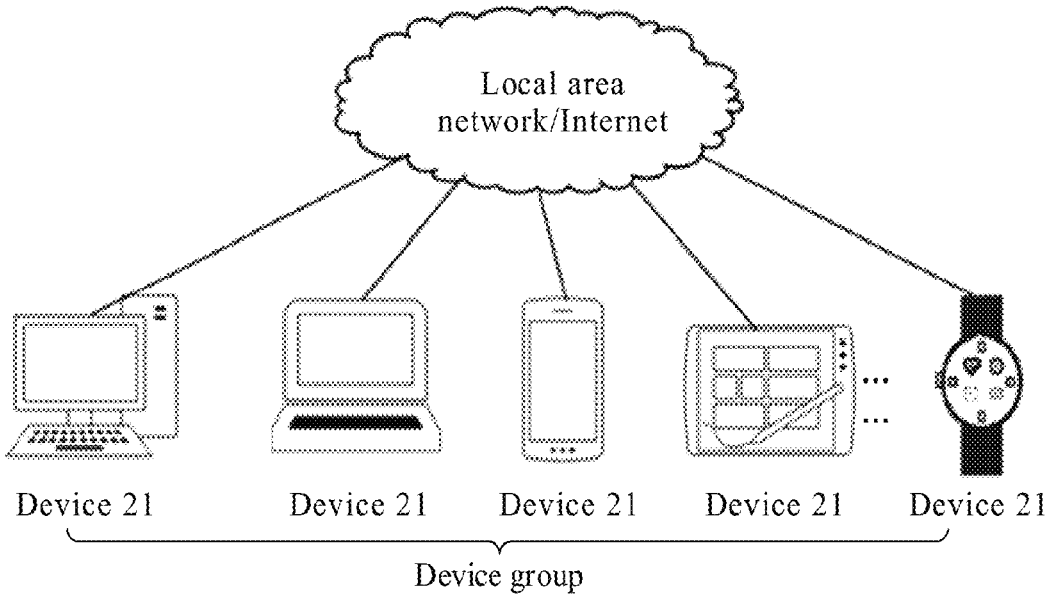
FIG. 1 is a schematic diagram of an application scenario of a device group according to an embodiment of the present invention.

A display method provided in an embodiment of this application may be applied to a device group 200 shown in FIG. 1, and N (N≥2) devices 21 in the device group 200 can communicate with each other.

For example, a mobile phone, a wearable device, and a notebook computer of a user may be used as the device group 200. When the user logs in to the mobile phone, the wearable device, and the notebook computer by using a same account, the mobile phone, the wearable device, and the notebook computer constitute a local area network (LAN), and the devices in the local area network can communicate with each other.

For another example, the devices 21 may alternatively constitute a local area network in a wireless communication mode (for example, Bluetooth, Wi-Fi, or a ZigBee network). In this case, a set of all the devices in the local area network may be used as the device group 200.

Certainly, in addition to the local area network, the devices 21 in the device group 200 may be interconnected by using a cellular network, to implement a communication process between the devices 21 in the device group 200. This is not limited in the embodiments of the present invention.

In the embodiments of the present invention, any device (for example, a first device) in the device group 200 may initiate a screen projection request to one or more other devices, and a device (for example, a second device) that receives the screen projection request may send display data in a display interface on a display screen of the second device to the first device, so that the first device displays the display interface of the second device on a display screen of the first device based on the display data. Subsequently, a user may trigger, on the first device, a corresponding operation for the projected display interface of the second device. For example, if the user taps, on the display screen of the first device, an icon of an application A in the display interface of the second device, the first device may send a corresponding operation instruction (for example, an operation instruction for opening the application A) to the second device, and the second device executes the operation instruction, to manage the second device.

In this way, the user may use any device in the device group as a controlling device based on an actual requirement, select another device in the device group as a controlled device, and project a display interface of the controlled device onto a display screen of the controlling device, to implement a function of screen projection between any two devices in the device group.

It should be noted that, before the user selects a device to perform an operation, each device in the device group is in an equal status, and the user may select any device as the controlling device. The controlling device is configured to obtain an operation entered by the user, to actively trigger a function related to screen projection between the controlling device and another device in the device group. It may be understood that each device in the device group may be used as an active device, to actively initiate a screen projection function.

In addition, the controlling device may further manage a running status of the controlled device in the projected display interface, and in a management process, a function of a device may be implemented on another device without depending on a server of a network-side device or an APP of a managed device, so that efficiency of collaboration between a plurality of devices in a device interconnection scenario is increased, and using experience of the user can be improved.

In addition, the device 21 in the device group 200 may specifically be any device that has a display function, such as a mobile phone, a wearable device, an augmented reality (AR)/virtual reality (VR) device, a tablet computer, a notebook computer, or a smart household appliance (for example, a smart refrigerator, a smart television, an electronic doorbell, or a surveillance camera). This is not limited in the embodiments of the present invention.

Figure 2:
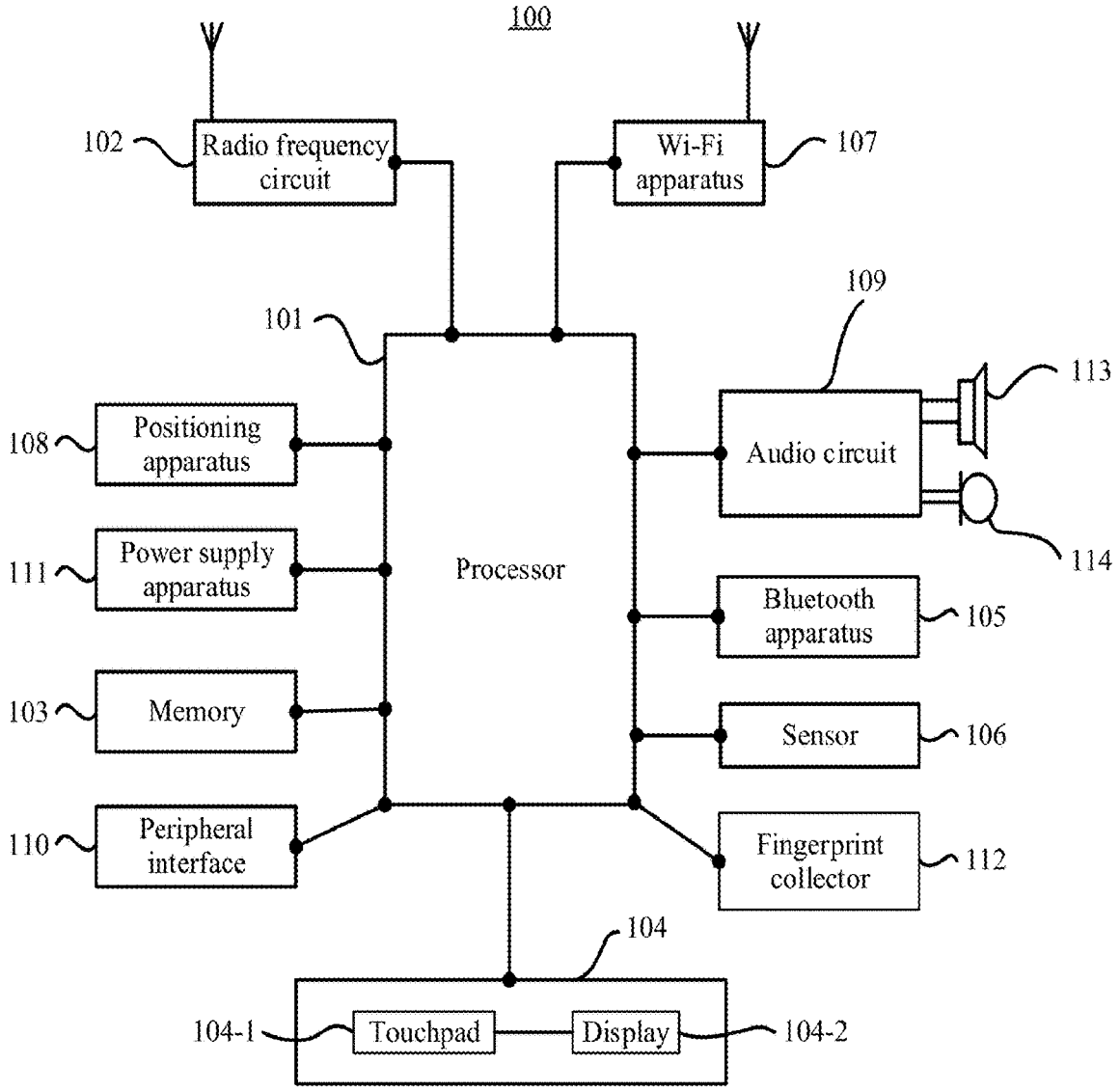
FIG. 2 is a first schematic structural diagram of a device in a device group according to an embodiment of the present invention.

As shown in FIG. 2, that a mobile phone 100 is used as a device in the device group is used as an example. The mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). A person skilled in the art may understand that a hardware structure shown in FIG. 2 does not constitute a limitation on the mobile phone, and the mobile phone 100 may include more or fewer components than those shown in the figure, or include a combination of some components, or have different component arrangements.

The following describes the components of the mobile phone 100 in detail with reference to FIG. 2.

The processor 101 is a control center of the mobile phone 100. The processor 101 is connected to parts of the mobile phone 100 by using various interfaces and lines, runs or executes an application program stored in the memory 103, and invokes data stored in the memory 103, to perform various functions of the mobile phone 100 and process data. In some embodiments, the processor 101 may include one or more processing units. For example, the processor 101 may be a Kirin 960 chip manufactured by Huawei Technologies Co., Ltd. In some embodiments of this application, the processor 101 may further include a fingerprint verification chip, configured to verify a collected fingerprint.

The radio frequency circuit 102 may be configured to receive and send a radio signal in an information receiving and sending process or in a call process. Particularly, after receiving downlink data from a base station, the radio frequency circuit 102 may send the downlink data to the processor 101 for processing. In addition, the radio frequency circuit 102 sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, email, a short message service, and the like.

The memory 103 is configured to store an application program and data. The processor 101 runs the application program and the data stored in the memory 103, to perform various functions of the mobile phone 100 and process data. The memory 103 mainly includes a program storage area and a data storage area. The program storage area may store an operating system, and an application program required by at least one function (for example, a sound play function or an image play function). The data storage area may store data (for example, audio data or a phone book) created based on use of the mobile phone 100. In addition, the memory 103 may include a high-speed random access memory (RAM), or may include a non-volatile memory such as a magnetic disk storage device, a flash memory device, or another volatile solid-state storage device. The memory 103 may store various operating systems such as an iOS® operating system developed by Apple Inc. and an Android® operating system developed by Google LLC. The memory 103 may be independent, and is connected to the processor 101 by using the communications bus. Alternatively, the memory 103 may be integrated into the processor 101.

The touchscreen 104 may include a touchpad 104-1 and a display 104-2.

The touchpad 104-1 may collect a touch event performed by a user of the mobile phone 100 on or near the touchpad 104-1 (for example, an operation performed by the user on the touchpad 104-1 or near the touchpad 104-1 by using any proper object such as a finger or a stylus), and send collected touch information to another component (for example, the processor 101). The touch event performed by the user near the touchpad 104-1 may be referred to as a hovering touch. The hovering touch may mean that the user does not need to directly touch the touchpad for selecting, moving, or dragging an object (for example, an icon), and the user only needs to be near the device to perform a desired function. In addition, the touchpad 104-1 may be implemented in a plurality of types such as a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be implemented in a form of a liquid crystal display, an organic light emitting diode, or the like. The touchpad 104-1 may cover the display 104-2. When detecting a touch event on or near the touchpad 104-1, the touchpad 104-1 transfers the touch event to the processor 101 to determine a type of the touch event. Then, the processor 101 may provide a corresponding visual output on the display 104-2 based on the type of the touch event. Although the touchpad 104-1 and the display screen 104-2 in FIG. 2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking layers of materials. In this embodiment of this application, only the touchpad (layer) and the display screen (layer) are shown, and other layers are not described in this embodiment of this application. In addition, the touchpad 104-1 may be disposed on a front side of the mobile phone 100 in a full panel form, and the display screen 104-2 may also be disposed on the front side of the mobile phone 100 in a full panel form. In this way, a bezel-less structure can be implemented on the front side of the mobile phone.

In addition, the mobile phone 100 may further have a fingerprint recognition function. For example, a fingerprint recognizer 112 may be disposed on a back side of the mobile phone 100 (for example, a lower part of a rear-facing camera), or a fingerprint recognizer 112 may be disposed on the front side of the mobile phone 100 (for example, a lower part on the touchscreen 104). For another example, a fingerprint collector 112 may be disposed in the touchscreen 104, to implement a fingerprint recognition function. In other words, the fingerprint collector 112 may be integrated into the touchscreen 104 to implement the fingerprint recognition function of the mobile phone 100. In this case, the fingerprint collector 112 is disposed in the touchscreen 104, and may be a part of the touchscreen 104, or may be disposed in the touchscreen 104 in another manner. A main component of the fingerprint collector 112 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, and the like.

The mobile phone 100 may further include the Bluetooth apparatus 105, configured to implement data exchange between the mobile phone 100 and another device (for example, a mobile phone or a smartwatch) at a short distance from the mobile phone 100. In this embodiment of this application, the Bluetooth apparatus may be an integrated circuit, a Bluetooth chip, or the like.

The mobile phone 100 may further include at least one type of sensor 106, such as a light sensor, a motion sensor, or another sensor. Specifically, the optical sensor may include an ambient light sensor and a proximity sensor. The ambient light sensor may adjust luminance of the display of the touchscreen 104 based on brightness of ambient light. The proximity sensor may power the display off when the mobile phone 100 approaches to ears. As a type of motion sensor, an accelerometer sensor may detect values of acceleration in all directions (usually, three axes), may detect a value and a direction of gravity when the sensor is stationary, and may be used in an application for recognizing a mobile phone posture (such as screen switch between a landscape mode and a portrait mode, a related game, or magnetometer posture calibration), a function related to vibration recognition (such as a pedometer or a knock), and the like. Other sensors such as a gyroscope, a barometer, a hygrometer, a thermometer, and an infrared sensor may further be disposed in the mobile phone 100. Details are not described herein.

The Wi-Fi apparatus 107 is configured to provide, for the mobile phone 100, network access that complies with a Wi-Fi related standard protocol. The mobile phone 100 may access a Wi-Fi access point by using the Wi-Fi apparatus 107, to help the user receive and send an email, browse a web page, access streaming media, and the like. The Wi-Fi apparatus 107 provides a wireless broadband Internet access for the user. In some other embodiments, the Wi-Fi apparatus 107 may alternatively be used as a Wi-Fi wireless access point, and may provide another device with Wi-Fi network access.

The positioning apparatus 108 is configured to provide a geographic location for the mobile phone 100. It may be understood that the positioning apparatus 108 may specifically be a receiver of a positioning system such as a global positioning system (GPS), a BeiDou navigation satellite system, or a Russian GLONASS. After receiving a geographic location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisting server to assist the positioning apparatus 108 in completing ranging and positioning services. In this case, the AGPS system assists a positioning server in communicating, through a wireless communications network, with the positioning apparatus 108 (namely, a GPS receiver) of the device such as the mobile phone 100 and providing positioning assistance. In some other embodiments, the positioning apparatus 108 may alternatively be a positioning technology based on a Wi-Fi access point. Each Wi-Fi access point has a globally unique MAC (media access control) address, and the device can scan and collect a broadcast signal of a surrounding Wi-Fi access point when Wi-Fi is enabled. Therefore, the device can obtain a MAC address broadcast by the Wi-Fi access point. The device sends, to a location server through the wireless communications network, such data (for example, the MAC address) that can identify the Wi-Fi access point. The location server retrieves a geographic location of each Wi-Fi access point, calculates a geographic location of the device with reference to strength of the Wi-Fi broadcast signal, and sends the geographic location of the device to the positioning apparatus 108 of the device.

The audio circuit 109, a loudspeaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for outputting. In addition, the microphone 114 converts a collected sound signal into an electrical signal, and the audio circuit 109 converts the electrical signal into audio data after receiving the electrical signal, and then outputs the audio data to the RF circuit 102 to send the audio data to, for example, another mobile phone, or outputs the audio data to the memory 103 for further processing.

The peripheral interface 110 is configured to provide various interfaces for external input/output devices (such as a keyboard, a mouse, a display externally connected to the mobile phone 100, an external memory, and a subscriber identity module card). For example, the mobile phone 100 is connected to the mouse through a universal serial bus (USB) interface, and the mobile phone 100 is connected, through a metal contact on a card slot of the subscriber identity module card, to the subscriber identity module (SIM) card provided by a telecommunications operator. The peripheral interface 110 may be configured to couple the external input/output peripheral device to the processor 101 and the memory 103.

In this embodiment of the present invention, the mobile phone 100 may communicate with another device in the device group through the peripheral interface 110. For example, the mobile phone 100 may receive, through the peripheral interface 110, display data sent by the another device and display the display data. This is not limited in this embodiment of the present invention.

The mobile phone 100 may further include a power supply apparatus 111 (for example, a battery and a power management chip) that supplies power to the components. The battery may be logically connected to the processor 101 by using the power management chip, so that functions such as charging management, discharging management, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein.

In this embodiment of the present invention, any display device (for example, the foregoing mobile phone 100) may join a created device group by accessing a Wi-Fi network, accessing a local area network, or accessing the Internet. For example, a user enables a Wi-Fi network at home, and enables a smart television and a smart refrigerator at home to access the Wi-Fi network. In this case, the created device group includes the smart television and the smart refrigerator. Then, after the user enables a Wi-Fi function of the mobile phone 100 and the mobile phone 100 successfully accesses the Wi-Fi network, it means that the mobile phone 100 joins the device group.

When the mobile phone 100 joins the device group 200 for the first time, the mobile phone 100 may store an identifier of at least one device in the device group 200, to establish a trust relationship with the device. The trust relationship is used to indicate that communication is allowed between two devices that each store an identifier of the other device, so that the mobile phone 100 subsequently sends a screen projection request to another device that has established a trust relationship with the mobile phone 100 in the device group 200, so as to manage a running status of the another device.

Figure 3:
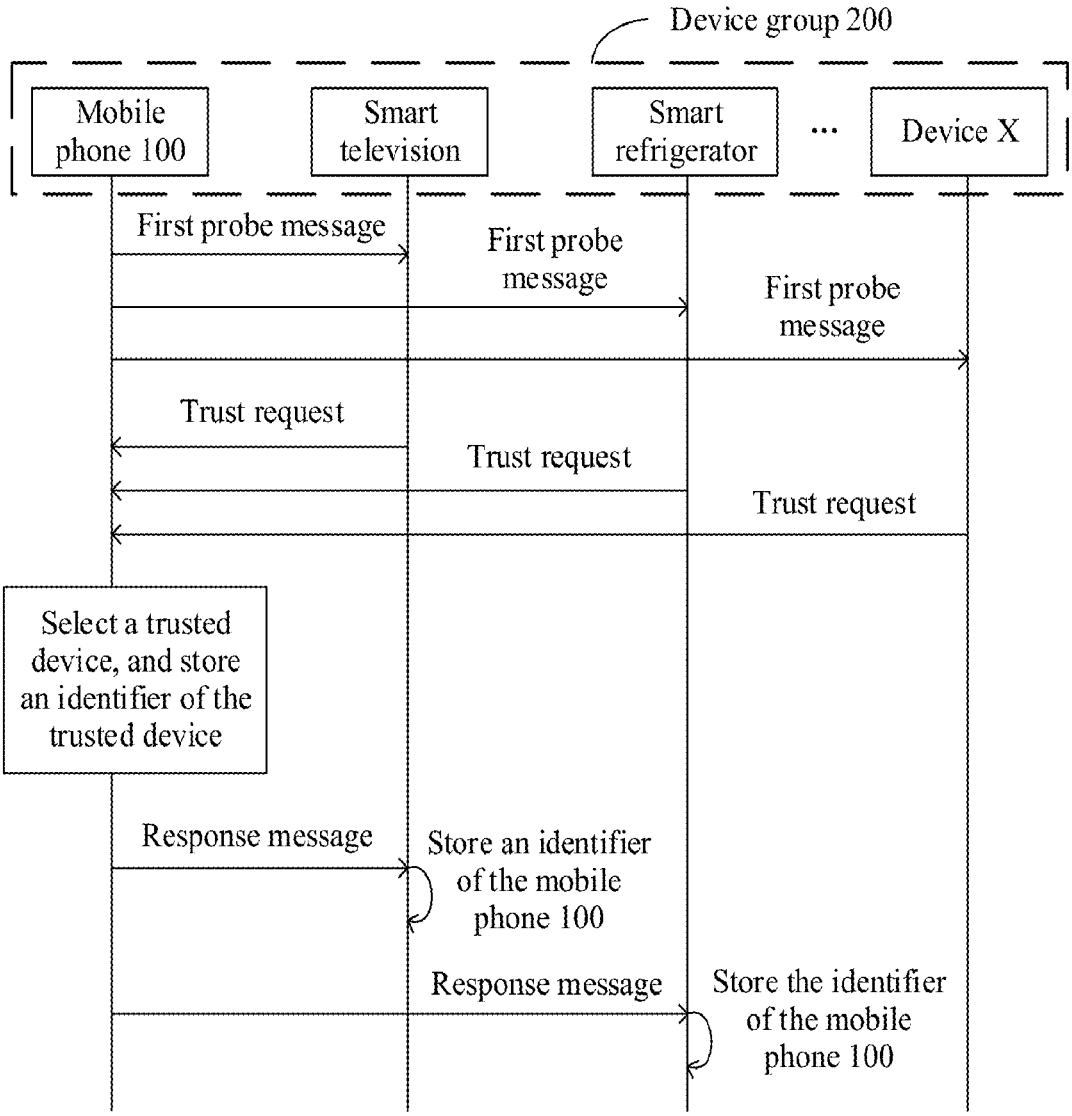
FIG. 3 is a first schematic diagram of interaction for establishing a trust relationship according to an embodiment of the present invention.

In one embodiment, as shown in FIG. 3, a plurality of devices in the device group 200 may constitute a local area network after establishing a wireless connection through Wi-Fi. When joining the device group 200, the mobile phone 100 may send a first probe message, for example, a probe request frame, to each device in the device group 200. Further, a device that receives the first probe message in the device group 200 may send a trust request to the mobile phone 100. The trust request is used to request the mobile phone 100 that newly joins the local area network to establish a trust relationship with the device, and the trust request carries an identifier of the device that sends the trust request.

Figure 4:
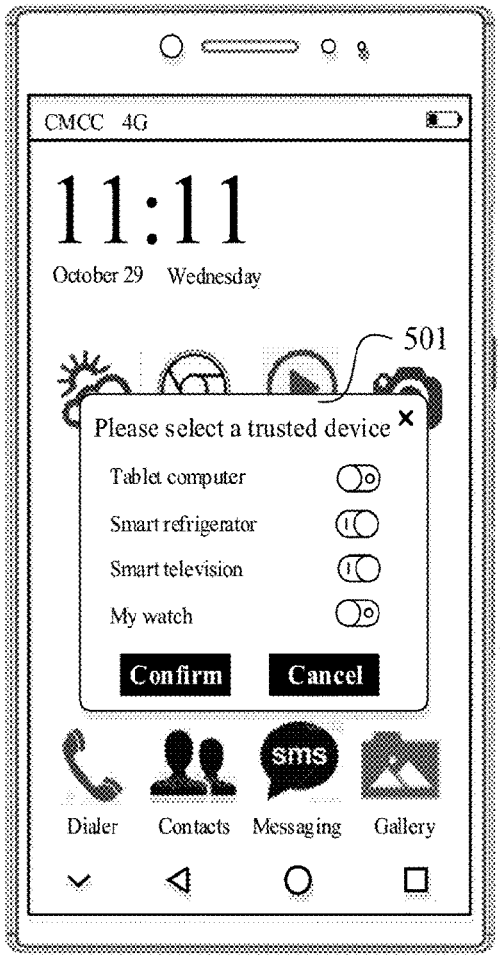
FIG. 4 is a schematic diagram of an application scenario of establishing a trust relationship according to an embodiment of the present invention.

After the mobile phone 100 receives the trust request sent by one or more devices in the device group 200, the user may be prompted, in a UI (user interface) of the mobile phone 100, whether to establish a trust relationship with the one or more devices. As shown in FIG. 4, the mobile phone 100 may present, to the user in a form of a list 501, devices that send the trust request to the mobile phone 100, and the user may select a trusted device from the list 501.

For example, if the user selects the smart television and the smart refrigerator in the list 501 as trusted devices, the mobile phone 100 may locally store identifiers of the smart television and the smart refrigerator, to establish a trust relationship between the mobile phone 100 and the smart television and a trust relationship between the mobile phone 100 and the smart refrigerator. In addition, the mobile phone 100 may further send a response message to each of the smart television and the smart refrigerator. The response message carries an identifier of the mobile phone 100. In this way, after receiving the response message sent by the mobile phone 100, the smart television and the smart refrigerator may also locally store the identifier of the mobile phone 100, to establish the trust relationships with the mobile phone 100.

In this case, the mobile phone 100 and the trusted devices (e.g., a smart television and a smart refrigerator) of the mobile phone 100 each store the identifier of the other device. Therefore, the mobile phone 100 may communicate with the trusted devices based on the identifiers of the trusted devices, and the trusted devices may also communicate with the mobile phone 100 based on the identifier of the mobile phone 100.

An identifier of any device in the device group 200, for example, the identifier of the mobile phone 100, the identifier of the smart television, or the identifier of the smart refrigerator, may specifically be a unique identifier of the device such as a media access control (MAC) address or an international mobile equipment identity (IMEI) of the device; or may be a user-defined identifier in the device group 200. For example, 00 is defined as the identifier of the mobile phone 100, and 01 is defined as the identifier of the smart refrigerator. This is not limited in this embodiment of the present invention.

Further, when a device in the device group 200 sends a trust request to the mobile phone 100, the trust request may further carry a screen projection parameter used when the device performs a screen projection function, for example, at least one of a plurality of parameters such as resolution supported by the device, a supported coding format, whether audio data receiving is supported, whether a multiple-data-channel transmission mode is supported, and whether a mouse (or keyboard) input manner is supported.

Figure 5:
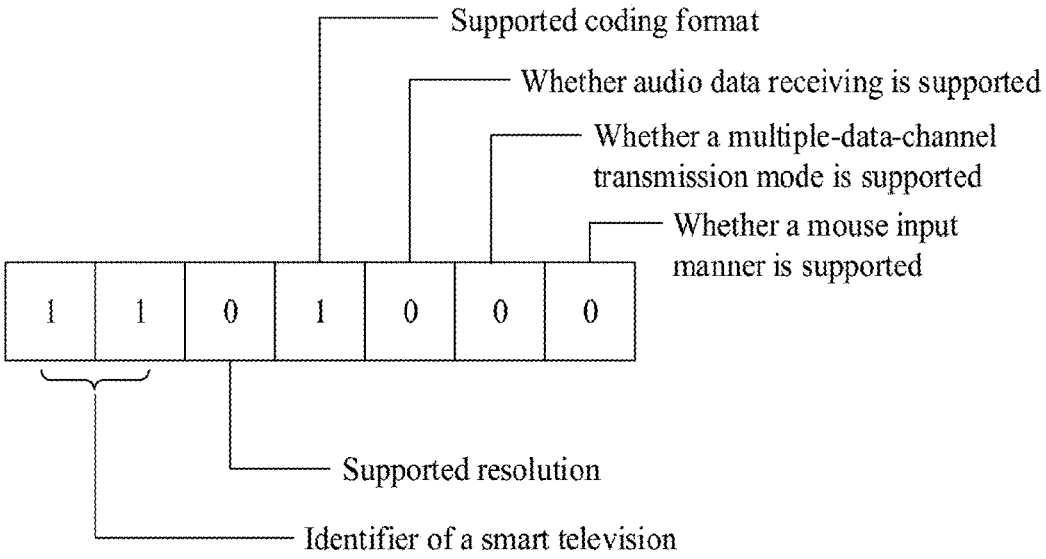
FIG. 5 is a schematic structural diagram of a trust request according to an embodiment of the present invention.

For example, as shown in FIG. 5, the trust request sent by the smart television to the mobile phone 100 includes seven bits. The first two bits are used to indicate the identifier of the smart television (for example, the identifier of the smart television is 11). The third bit is used to indicate resolution supported by the smart television (0 represents resolution of 1366×768, and 1 represents resolution of 640×480). The fourth bit is used to indicate a coding format supported by the smart television (0 represents that the coding format is American standard code for information interchange (ASCII), and 1 represents that the coding format is Chinese encoding character set (GB2312) for information exchange). The fifth bit is used to indicate whether the smart television supports audio data receiving (0 indicates yes, and 1 indicates no). The sixth bit is used to indicate whether the smart television supports the multiple-data-channel transmission mode (0 indicates yes, and 1 indicates no). The seventh bit is used to indicate whether the smart television supports the mouse (or keyboard) input manner (0 indicates yes, and 1 indicates no).

In this way, the mobile phone 100 may obtain a screen projection parameter of the smart television from the trust request. When the smart television subsequently projects its screen onto the mobile phone 100, the mobile phone 100 may adjust, based on the resolution of the smart television, a display interface during projection, or decode, based on the coding format supported by the smart television, data sent by the smart television. In addition, when the smart television supports audio data receiving, the mobile phone 100 may further send collected user voice to the smart television. When the smart television supports the multiple-data-channel transmission mode, the smart television may further send, to the mobile phone 100 through a separate data channel, information such as subtitles displayed by the smart television. When the smart television supports the mouse (or keyboard) input manner, the mobile phone 100 may directly send, to the smart television, an event entered by the user by using a mouse (or a keyboard) on the mobile phone 100.

Similarly, the response message sent by the mobile phone 100 to the trusted devices (for example, the smart television and the smart refrigerator) may also carry a screen projection parameter of the mobile phone 100, so that the trusted devices learn of a screen projection capability of the mobile phone 100 when the mobile phone 100 performs a screen projection function.

Certainly, after the mobile phone 100 joins the device group 200, the mobile phone 100 may also actively send a trust request to another device in the device group, in other words, request to establish a trust relationship with the another device in the device group 200. After the another device receives the trust request sent by the mobile phone 100, if agreeing to establish the trust relationship with the mobile phone 100, the another device sends a trust response to the mobile phone 100. The trust response may carry an identifier of the another device, for example, the identifier 01 of the smart refrigerator. In this case, the mobile phone 100 locally stores the identifier 01 of the smart refrigerator, to establish the trust relationship with the smart refrigerator.

Certainly, the trust request actively sent by the mobile phone 100 may also carry the identifier of the mobile phone 100, so that the device that receives the trust request, for example, the smart refrigerator, may locally store the identifier of the mobile phone 100, to establish a trust relationship with the mobile phone 100.

In addition, the devices in the device group may perform communication based on an existing communications protocol. For example, when the devices in the device group are interconnected through Wi-Fi, the devices may perform communication by using an existing Wi-Fi standard protocol. For example, user-defined information such as the foregoing screen projection parameter may be carried in a user-defined field predefined in the Wi-Fi standard protocol. Certainly, a person skilled in the art may also extend or modify the existing Wi-Fi standard protocol, to add the foregoing screen projection parameter to an extended or modified Wi-Fi standard protocol. This is not limited in this embodiment of the present invention.

It may be understood that a person skilled in the art may set specific content in the foregoing screen projection parameter based on actual experience or an actual application scenario. This is not limited in this embodiment of the present invention.

Figure 6:
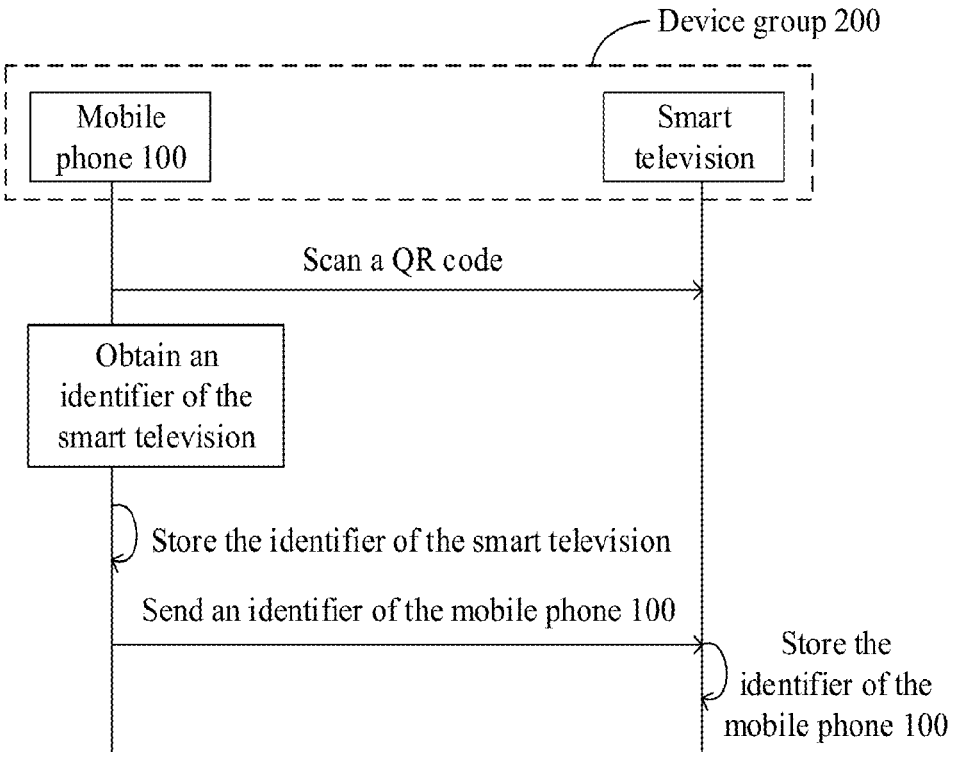
FIG. 6 is a second schematic diagram of interaction for establishing a trust relationship according to an embodiment of the present invention.

In another possible design method, the devices in the device group 200 may establish trust relationships in another manner such as scanning a QR (quick response) code or inputting a device identifier. For example, the identifier of the smart television may be made into a QR code in advance and displayed on the smart television. As shown in FIG. 6, the mobile phone 100 may obtain the identifier of the smart television (for example, an IP address of the smart television) from the QR code by scanning the QR code. Further, the mobile phone 100 may be triggered to send the identifier (for example, a MAC address) of the mobile phone 100 to the smart television. In addition, the mobile phone 100 and the smart television each may locally store the device identifier of the other device, to establish the trust relationship between the mobile phone 100 and the smart television. In this way, the user only needs to perform a QR code scanning operation once, to implement a process of establishing a trust relationship between two devices in the device group 200.

For example, each device in the device group 200 may maintain a list of trusted devices. The mobile phone 100 is used as an example. After obtaining the identifier of the smart television, the mobile phone 100 may store the identifier of the smart television in a list of trusted devices of the mobile phone 100, and use the smart television as the trusted device, to establish the trust relationship between the mobile phone 100 and the smart television.

Figure 7:
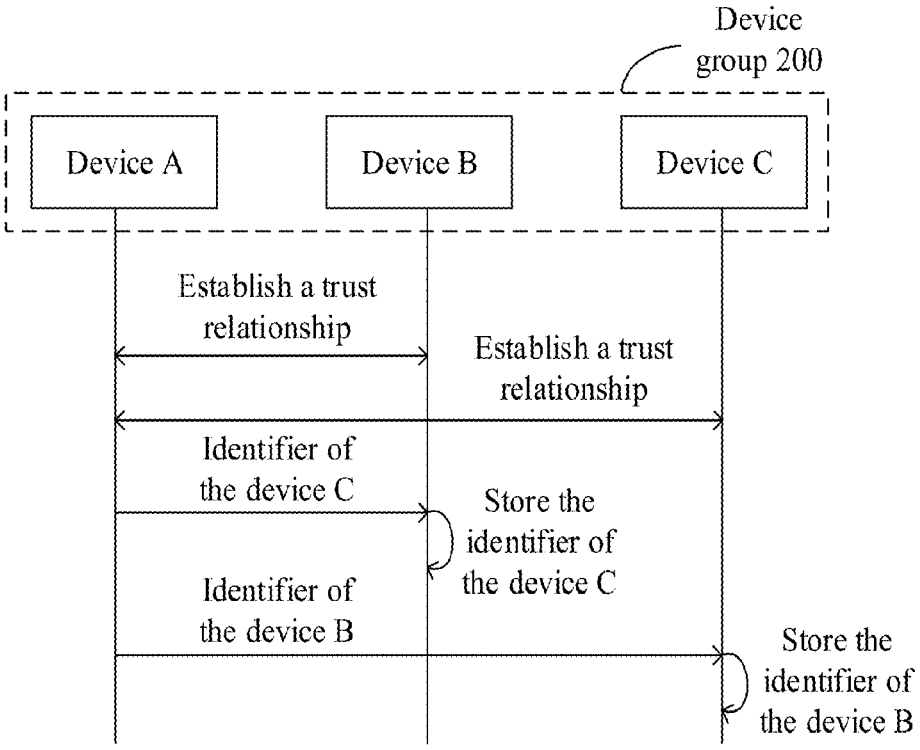
FIG. 7 is a third schematic diagram of interaction for establishing a trust relationship according to an embodiment of the present invention.

In one embodiment, any device in the device group 200 may further determine, in a trust relationship recorded by the device, devices between which a trust relationship needs to be established. For example, as shown in FIG. 7, in the device group 200, a trust relationship is established between a device A and a device B, and a trust relationship is also established between the device A and a device C. In this case, the device A may determine the device B and the device C as devices between which a trust relationship needs to be established. Further, the device A may send an identifier of the device C to the device B, so that the device B records the identifier of the device C, to establish a trust relationship with the device C. In addition, the device A may further send an identifier of the device B to the device C, so that the device C records the identifier of the device B, to establish a trust relationship with the device B.

Certainly, it may also be considered by default that a trust relationship exists between any two devices in the device group 200. This is not limited in this embodiment of the present invention.

In this embodiment of the present invention, any device (for example, the first device) in the device group 200 may send a screen projection request to another device (for example, the second device) when the second device is in a sleeping state, to project a display interface of the second device onto the first device, so that the user can manage a running status of the second device by using the first device.

Figure 8:
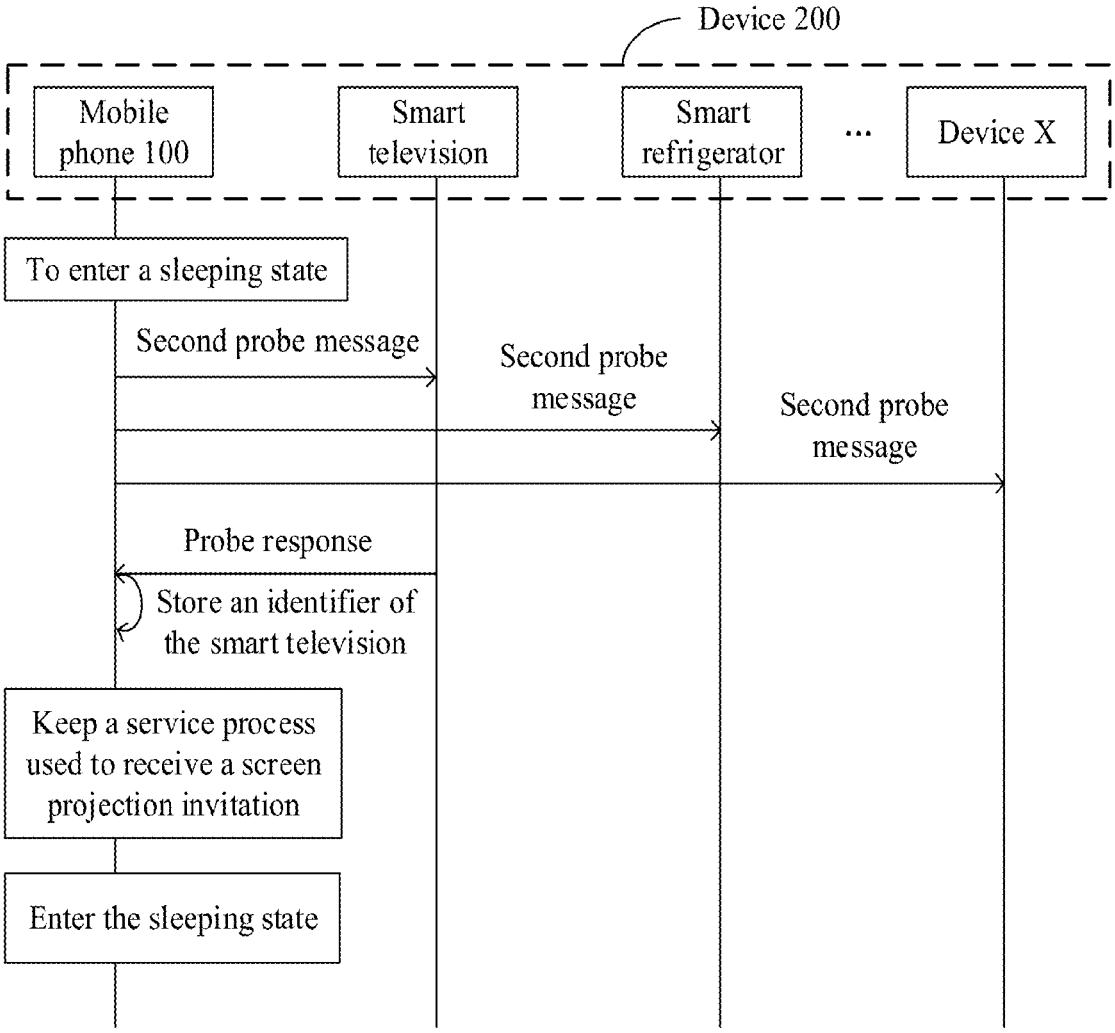
FIG. 8 is a schematic diagram of interaction for entering a sleeping state according to an embodiment of the present invention.

In one embodiment, when any device in the device group 200 is to enter a sleeping state, for example, after the user does not operate the mobile phone 100 for a long time, the mobile phone 100 is to turn off the screen and enter the sleeping state, as shown in FIG. 8, the mobile phone 100 may send a second probe message to one or more trusted devices in the device group 200 that have a trust relationship with the mobile phone 100. The second probe message is used to probe whether another device in the device group 200 has a screen projection requirement.

Each device in the device group 200 may preset a set of determining policies for determining whether the device has the screen projection requirement. For example, for the smart television, it may be set that the smart television always has the screen projection requirement in a running process of the smart television. To be specific, in the running process of the smart television, a screen of the smart television may need to be projected onto another device in the device group 200. For a smart air conditioner, it may be set that the smart air conditioner has the screen projection requirement in a running process of the smart air conditioner and in a preset time period after the running ends. For the mobile phone 100, it may be set that the mobile phone 100 has the screen projection requirement in an entire standby process of the mobile phone 100. This is not limited in this embodiment of the present invention.

In this way, as shown in FIG. 8, after receiving the second probe message sent by the mobile phone 100, a device in the device group 200 may determine, based on a determining policy of the device, whether the device has the screen projection requirement. For example, if the smart television receiving the second probe message is running, the smart television determines that the smart television has the screen projection requirement, and then the smart television may send a probe response to the mobile phone 100. Once the mobile phone 100 receives a probe response returned by any device, it indicates that a device may send a screen projection request to the mobile phone 100 later, to project the screen of the mobile phone 100 onto the device. Therefore, when the mobile phone 100 enters the sleeping state, a service process that is on the mobile phone 100 and that is used to receive a screen projection request may be kept, so that the service process can still monitor, after the mobile phone 100 enters the sleeping state, whether a screen projection request sent by another device is received.

If the mobile phone 100 does not receive a probe response returned by a device in the device group 200, the mobile phone 100 may disable the service process used to receive a screen projection request, and enter the sleeping state, to reduce power consumption after the mobile phone 100 enters the sleeping state.

Further, the mobile phone 100 may further cache, in a cache area, an identifier of the device that sends the probe response, for example, the identifier of the smart television and the identifier of the smart refrigerator. In this way, once an identifier of any device is stored in the cache area of the mobile phone 100, the mobile phone 100 is triggered to keep, when the mobile phone 100 is in sleep, the service process used to receive a screen projection request; otherwise, the mobile phone 100 may directly enter the sleeping state.

In addition, a regular wakeup process may be preset on the mobile phone 100, and after the mobile phone 100 enters the sleeping state, the regular wakeup process is triggered to run. In this case, after being woken up by the regular wakeup process at a specific interval, the mobile phone 100 may send the second probe message again to the devices having the trust relationships with the mobile phone 100 in the device group 200, to probe whether a device in the device group 200 has the screen projection requirement at this time. Similarly, after the mobile phone 100 receives a probe response returned by any device, the mobile phone 100 may keep, during sleep, the service process used to receive a screen projection request, so that the mobile phone 100 can obtain, during sleep, a latest device that has the screen projection requirement, so as to enable in time the service process used to receive a screen projection request.

Certainly, for any device in the device group 200, it may be considered by default that the device is in a state of having the screen projection requirement. In this case, each device may keep, during sleep, the service process used to receive a screen projection request. Once another device sends a screen projection request to the device, the device receiving the screen projection request may respond in time, and enable a screen projection service process, to send display data in a screen of the device to the device sending the screen projection request, so as to implement a screen projection function. The user may manually disable, in a setting interface of the device, the state of having the screen projection requirement. This is not limited in this embodiment of the present invention.

Figure 9:
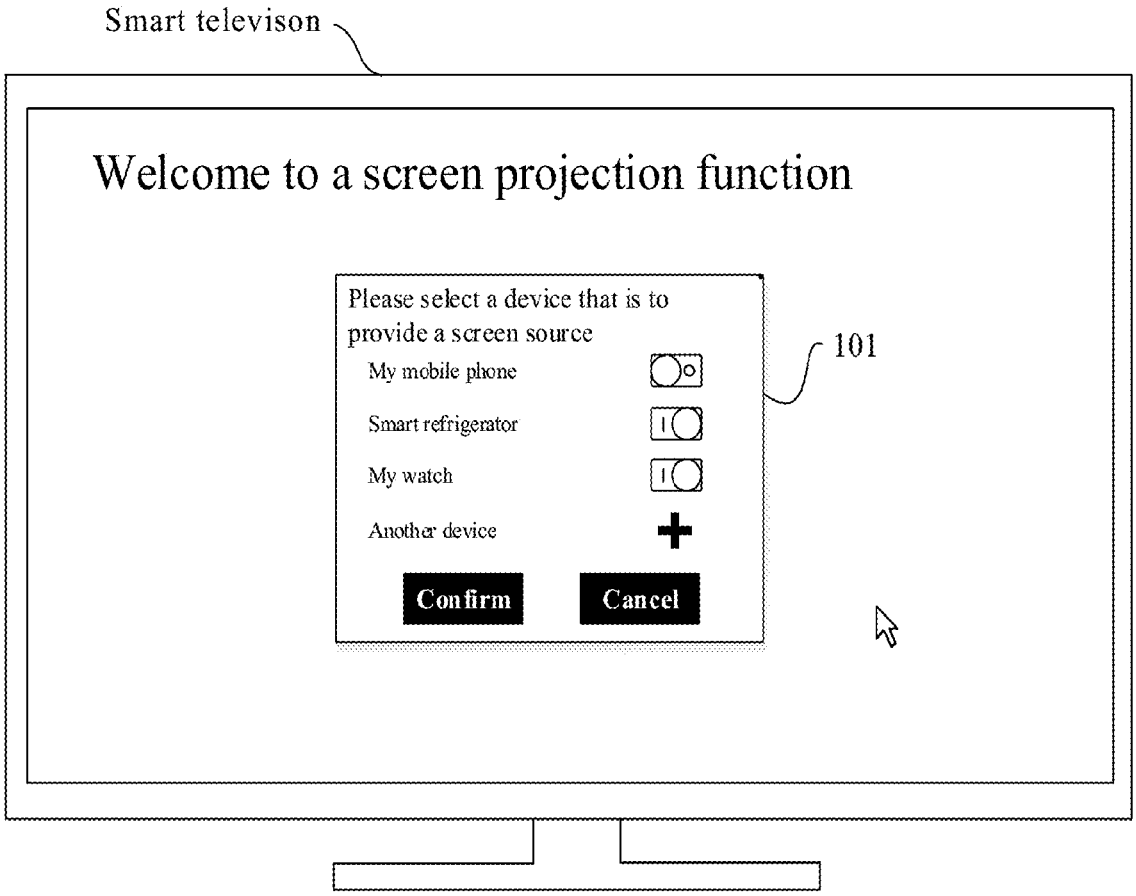
FIG. 9 is a first schematic diagram of an application scenario of a display method according to an embodiment of the present invention.

In this embodiment of the present invention, when any device (for example, the foregoing smart television) in the device group 200 has the screen projection requirement, for example, when the user is watching the television in a living room, the mobile phone 100 receives a call, but the user does not know where the mobile phone 100 is specifically placed, the user may enable the screen projection function on the smart television. As shown in FIG. 9, the smart television may display, to the user, a list 101 of devices that can provide a screen projection service at this time in the device group 200.

Figure 10:
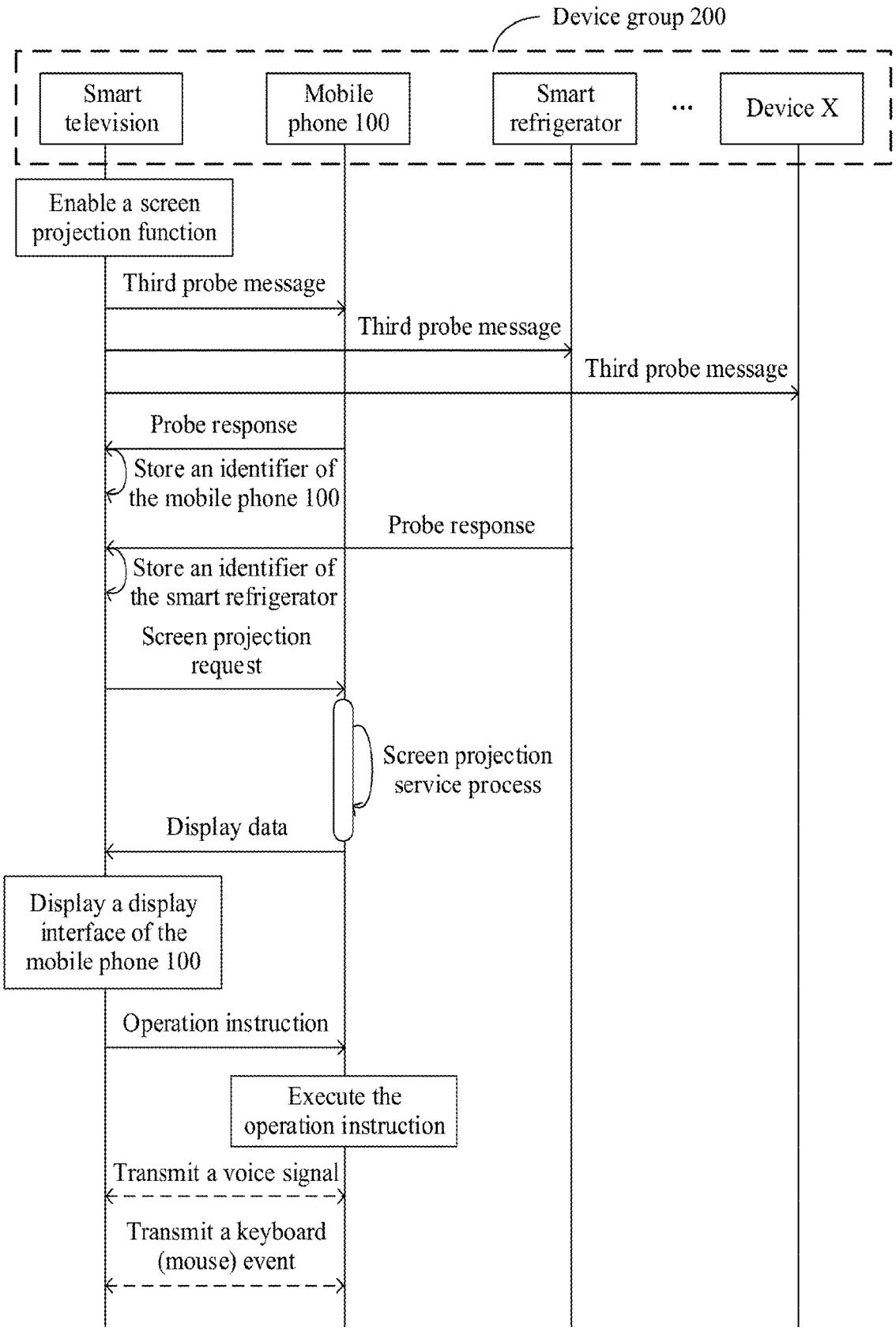
FIG. 10 is a schematic diagram of interaction of a display method according to an embodiment of the present invention.

In one embodiment, as shown in FIG. 10, after the screen projection function is enabled on the smart television, the smart television may send a third probe message to all trusted devices in the device group 200. The third probe message is used to probe whether the trusted devices in the device group 200 keep a service process used to receive a screen projection request. If a trusted device keeps the service process used to receive a screen projection request, it indicates that the trusted device can currently enable the screen projection function. In this case, the trusted device may send a probe response to the smart television. After receiving the probe response sent by one or more devices, the smart television may use the trusted devices sending the probe response as devices in the list of trusted devices and display the devices in a display interface of the smart television. For example, the smart television displays the device list 101 shown in FIG. 9 in the display interface of the smart television.

In this case, the user may select the mobile phone 100 in the device list 101, to project the screen of the mobile phone 100 into the display interface of the smart television. Further, still as shown in FIG. 10, the smart television sends a screen projection request to the mobile phone 100, where the screen projection request is used to invite the mobile phone 100 to project a display interface on the screen of the mobile phone 100 onto the smart television. The screen projection request may carry the identifier of the smart television, so that the invited device, namely, the mobile phone 100, sends display data in the display interface of the mobile phone 100 to the smart television based on the identifier of the smart television.

After the mobile phone 100 receives the screen projection request, if the mobile phone 100 does not enter the sleeping state, the mobile phone 100 may directly invoke a screen projection service process on the mobile phone to perform a screen projection service. Specifically, as shown in FIG. 10, the mobile phone 100 sends current real-time display data of the mobile phone 100 to the smart television. The display data in the display interface on the mobile phone 100 is usually stored, in a form of a stack, in a video memory of a video card of the mobile phone 100, and display data in a current display interface is usually located at the top of the stack. In this case, in the screen projection service process, the display data at the top of the stack may be transmitted to the smart television in real time at specific sending frequency.

Alternatively, if the mobile phone 100 has entered the sleeping state when the smart television sends the screen projection request to the mobile phone 100, because the mobile phone 100 keeps, before the mobile phone 100 enters the sleeping state, the service process used to receive the screen projection request, the mobile phone 100 can still receive the screen projection request in the sleeping state. In this case, the mobile phone 100 first needs to wake up the screen projection service process, then, the screen projection service process may wake up an operating system of the mobile phone 100, and then, the operating system of the mobile phone 100 generates corresponding display data and the display data is stored in the video card of the mobile phone 100. Subsequently, in the screen projection service process, the display data may still be transmitted to the smart television in real time. It should be noted that when waking up the operating system of the mobile phone 100, the screen projection service process may wake up the screen of the mobile phone 100 at the same time, or may perform the screen projection service in a screen-off state. This is not limited in this embodiment of the present invention.

In one embodiment, the mobile phone 100 may transmit the display data by using an RTP (Real-time Transport Protocol, real-time transport protocol). Specifically, the invited device, namely, the mobile phone 100, may compress the display data in the current display interface into a video stream and transmit the video stream in an RTP format. The video stream may be transmitted by using a connection-oriented transport protocol, for example, a TCP (Transmission Control Protocol, transmission control protocol), or may be transmitted by using a connectionless-oriented transport protocol, for example, a UDP (User Datagram Protocol, user datagram protocol). This is not limited in this embodiment of the present invention.

Figure 11:
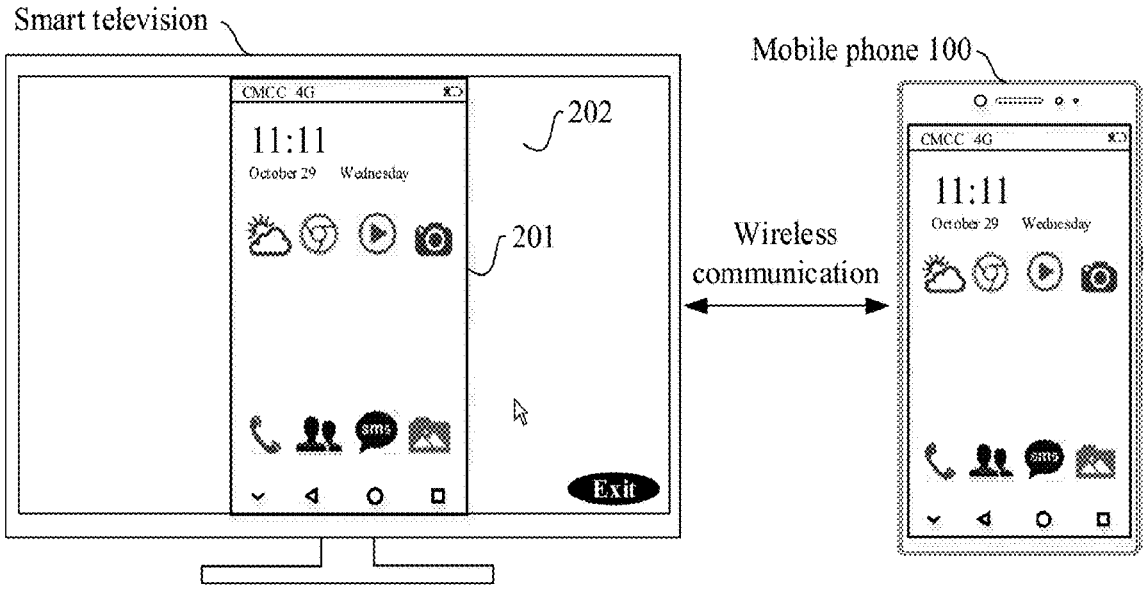
FIG. 11 is a second schematic diagram of an application scenario of a display method according to an embodiment of the present invention.

Further, after receiving the display data sent by the mobile phone 100, still as shown in FIG. 10, the smart television may display the display data in the display interface of the smart television, to implement a function of screen projection from the mobile phone 100 to the smart television. As shown in FIG. 11, the smart television displays, the display data sent by the mobile phone 100, in a display interface 202 of the smart television in a form of a window 201.

Figure 12:
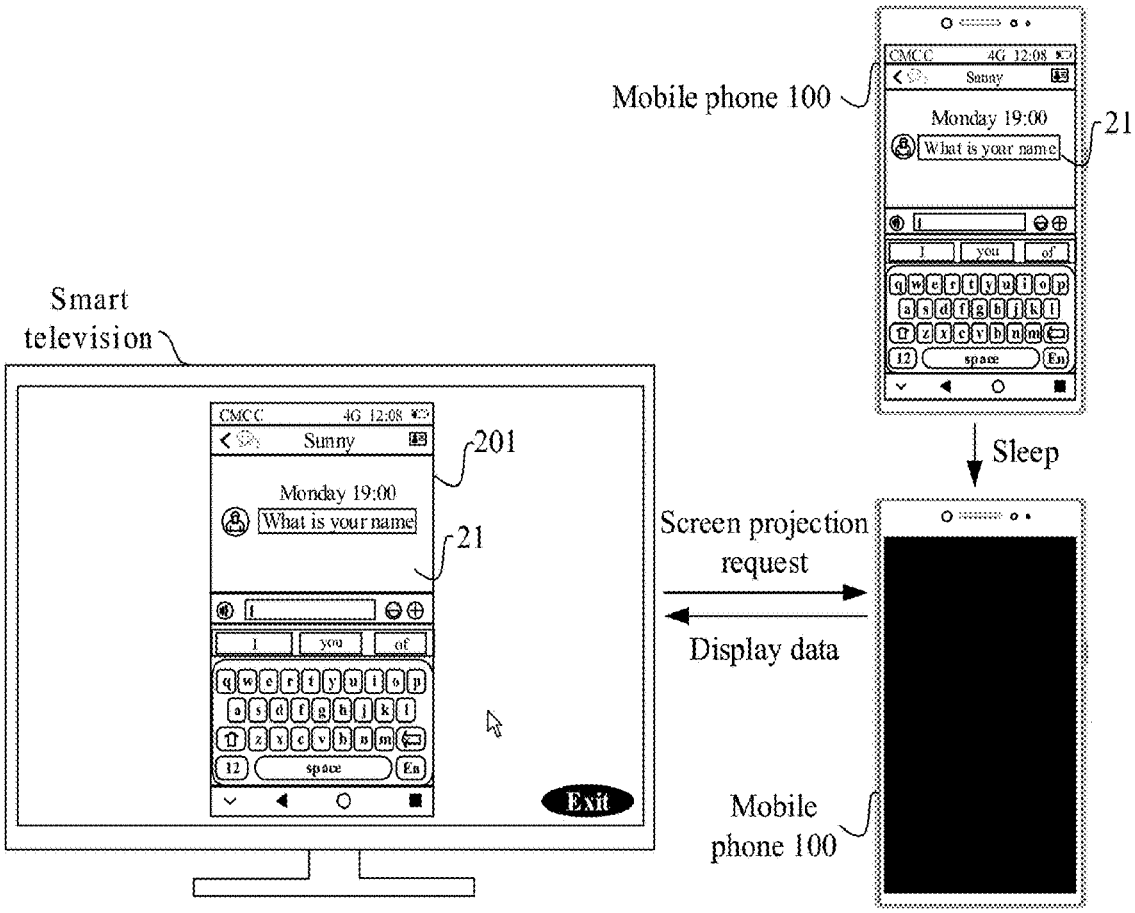
FIG. 12 is a third schematic diagram of an application scenario of a display method according to an embodiment of the present invention.

In addition, if the mobile phone 100 has entered the sleeping state when the smart television sends the screen projection request to the mobile phone 100, the mobile phone 100 may send, to the smart television, display data in a display interface maintained before the mobile phone 100 enters the sleeping state, so that the smart television can continue to display the display data from a display image displayed before the mobile phone 100 enters the sleeping state, thereby implementing a seamless display process of the mobile phone 100. For example, as shown in FIG. 12, the mobile phone 100 maintains a chat interface 21 of a WeChat application before entering the sleeping state. In this case, when the mobile phone 100 enters the sleeping state, display data in the chat interface 21 may be stored. Further, after the mobile phone 100 enters the sleeping state, if receiving the screen projection request sent by the smart television, the mobile phone 100 may send the display data in the chat interface 21 to the smart television, so that the smart television may continue to display the chat interface 21 in the window 201 of the smart television, and the user may continue to chat based on a last running progress of the mobile phone 100.

In one embodiment, when establishing the trust relationship with the mobile phone 100, the smart television has obtained the screen projection parameter of the mobile phone 100 when the mobile phone 100 performs the screen projection function, for example, resolution supported by the mobile phone 100. Then, the smart television may automatically adjust resolution of the window 201 based on the resolution supported by the mobile phone 100 and the resolution supported by the smart television. For example, the resolution of the smart television is 1366×768, and the resolution of the mobile phone 100 is 640×480. In this case, the smart television may adjust a size of the window 201 to a 640×480 window in the display interface 202 of the smart television, to display, the display data sent by the mobile phone 100, in the window 201, so that the smart television can adapt to the resolution of the smart television when displaying the display data sent by the mobile phone 100.

Figure 13:
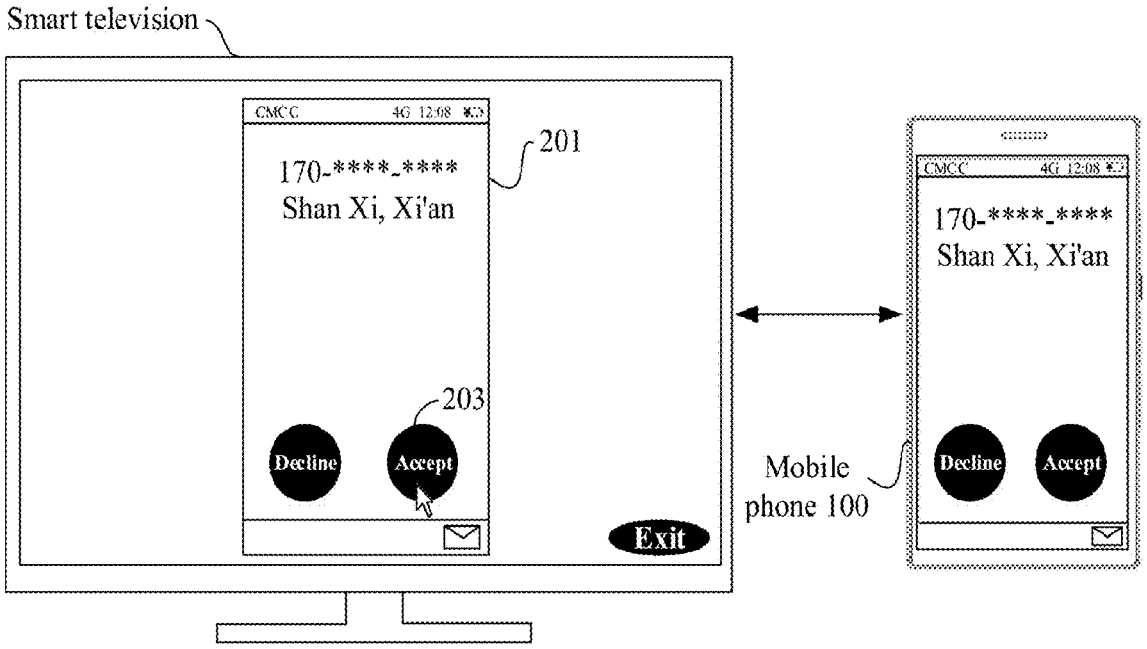
FIG. 13 is a fourth schematic diagram of an application scenario of a display method according to an embodiment of the present invention.

Further, after the smart television displays, the display data sent by the mobile phone 100, in the display interface of the smart television, the user may manage the mobile phone 100 on the smart television by operating a related interface element in the window 201, to implement a related function of the mobile phone 100. For example, as shown in FIG. 13, the smart television displays a current incoming call interface of the mobile phone 100 in the window 202, and in this case, the user may select an answer option 203 in the window 201 of the smart television.

In this case, after obtaining a management operation for selecting the answer option 203 by the user, still as shown in FIG. 10, the smart television may send a corresponding operation instruction to the mobile phone 100, and the mobile phone 100 executes the operation instruction. For example, after the user selects the answer option 203 in the window 201, the smart television sends, to the mobile phone 100 in response to the operation of the user, a corresponding operation instruction for answering a call. After receiving the operation instruction, the mobile phone 100 answers the call, to complete the operation instruction.

Figure 14:
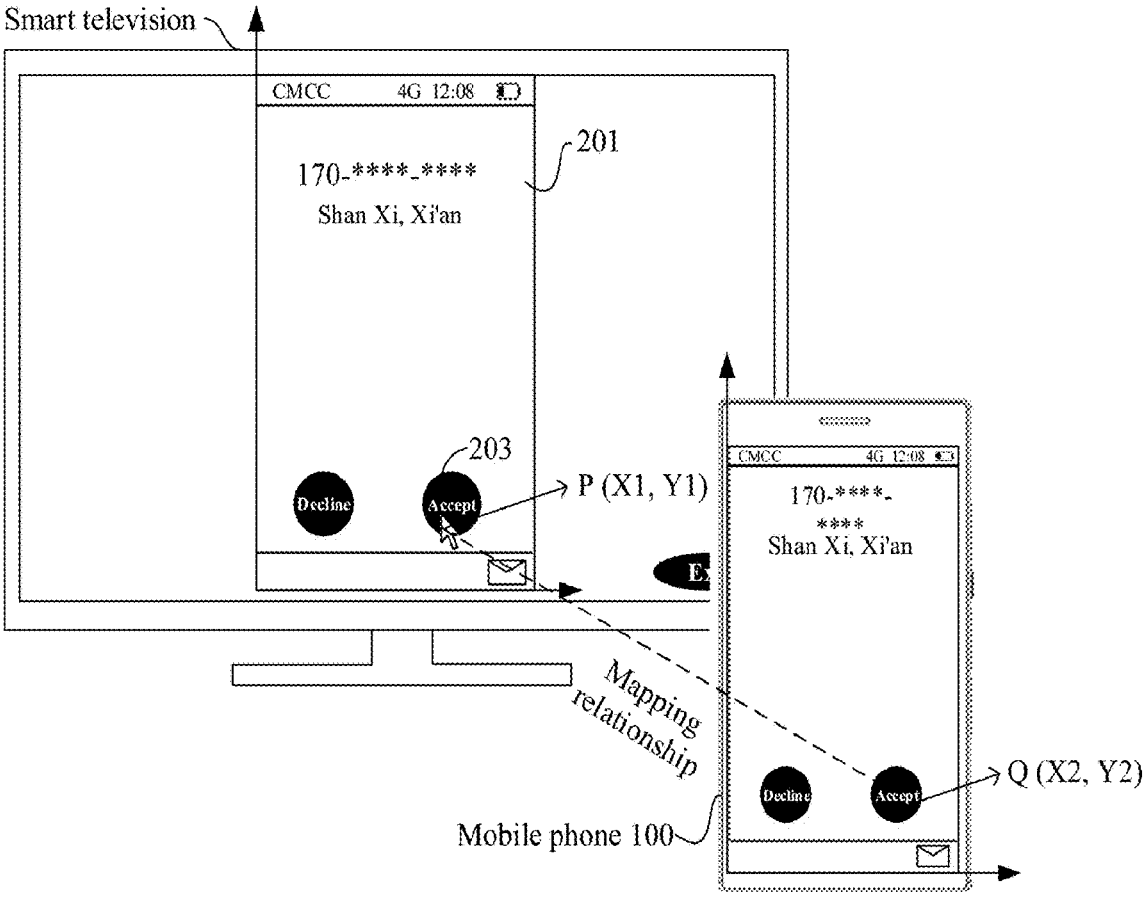
FIG. 14 is a fifth schematic diagram of an application scenario of a display method according to an embodiment of the present invention.

For example, as shown in FIG. 14, when detecting that the user taps the answer option 203 in the window 201, the smart television may obtain a coordinate point P (X1, Y1) of the tapped position in the window 201. Further, the smart television may determine, based on a coordinate mapping relationship between the window 201 on the smart television and the display interface 203 of the mobile phone 100, a coordinate point Q (X2, Y2) that corresponds to the coordinate point P (X1, Y1) and that is in the display interface 203 of the mobile phone 100. In this case, the smart television may add the coordinate point Q (X2, Y2) into the foregoing operation instruction and send the operation instruction to the mobile phone 100. After obtaining the operation instruction, the mobile phone 100 may determine, based on the coordinate point Q (X2, Y2), that the operation instruction triggered by the user at this time is answering the call, and then the mobile phone 100 may perform an operation of answering the call.

Certainly, the smart television may alternatively add the coordinate point P (X1, Y1) in the window 201 into the foregoing operation instruction and send the operation instruction to the mobile phone 100. Then, the mobile phone 100 determines, based on the coordinate mapping relationship between the window 201 and the display interface 203 of the mobile phone 100, the coordinate point Q (X2, Y2) that corresponds to the coordinate point P (X1, Y1) and that is in the display interface 203 of the mobile phone 100, and performs an operation of answering the call corresponding to Q (X2, Y2). This is not limited in this embodiment of the present invention.

Figure 15:
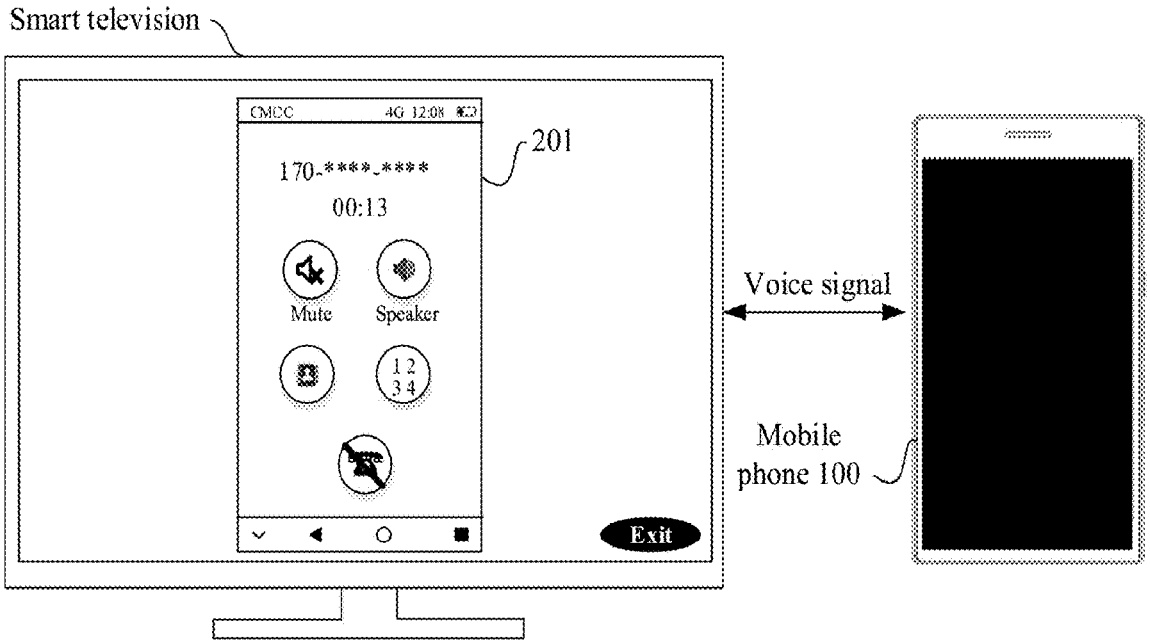
FIG. 15 is a sixth schematic diagram of an application scenario of a display method according to an embodiment of the present invention.

Further, after the mobile phone 100 answers the call, as shown in FIG. 15, the mobile phone 100 may synchronously transmit a received voice signal to the smart television. The smart television may play, for the user by using an output device such as a loudspeaker of the smart television, the voice signal sent by the mobile phone 100, so that the user can answer the call of the mobile phone 100 by using the smart television.

In addition, when the trust relationship is established, the screen projection parameter sent by the mobile phone 100 to the smart television indicates that the mobile phone 100 can support a screen projection function of audio data receiving. In this case, still as shown in FIG. 15, the smart television may further collect, by using an input device such as a microphone, a voice signal produced by the user, and then send the voice signal produced by the user to the mobile phone 100. Then, the mobile phone 100 transmits the received voice signal to the other device of the current call, so that the user can implement, on the smart television, a call function provided by the mobile phone 100.

In addition, if the mobile phone 100 supports input manners such as a screen touch, a mouse, and a keyboard, the smart television may further send, to the mobile phone 100 for processing, a screen operation, a mouse operation, a keyboard operation, and the like that are triggered by the user on the smart television, to implement a function that is related to the mobile phone 100 and triggered by the user on the smart television.

In one embodiment, the controlling device (for example, the foregoing smart television) that initiates the screen projection request may further actively send display data generated by the controlling device in real time to another device (for example, the foregoing mobile phone 100) in the device group for display. In this case, an identity of the smart television changes from a controlling device to a controlled device, and the mobile phone 100 may be used as the controlling device to manage a running status of the smart television.

Figure 16:
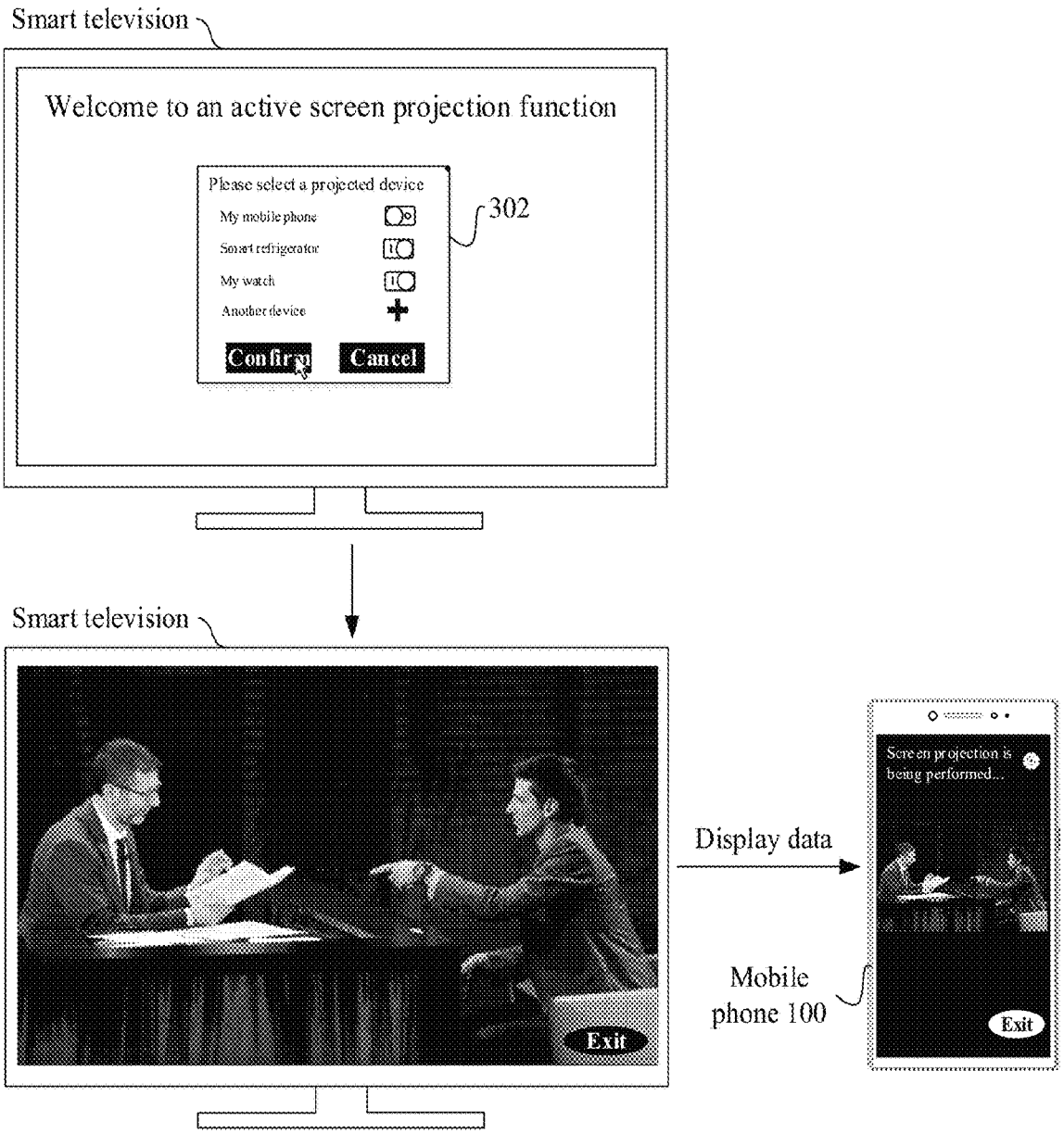
FIG. 16 is a seventh schematic diagram of an application scenario of a display method according to an embodiment of the present invention.

For example, when the user needs to project the display interface on the smart television into the display interface of the mobile phone 100, the user may trigger an active screen projection button on the smart television. When the smart television detects that the active screen projection button is triggered, as shown in FIG. 16, similar to FIG. 9, the smart television may display, in the current display interface, a list 302 of projected devices that can currently receive the display data. In this case, the user may select, from the list 302 of projected devices, a device that is to receive the display data of the smart television, for example, the mobile phone 100. Further, still as shown in FIG. 16, the smart television may send, to the mobile phone 100, display data in the display interface of the smart television, for example, a program A that is being played. The mobile phone 100 displays, in the display interface of the mobile phone 100, the program A that is being played by the smart television.

Certainly, similar to the foregoing case in which the mobile phone 100 projects the display interface of the mobile phone 100 onto the smart television, when projecting the display interface of the smart television onto the mobile phone 100, the smart television may also transmit a voice signal, a keyboard event, a mouse event, and the like. This is not limited in this embodiment of the present invention.

Figure 18:
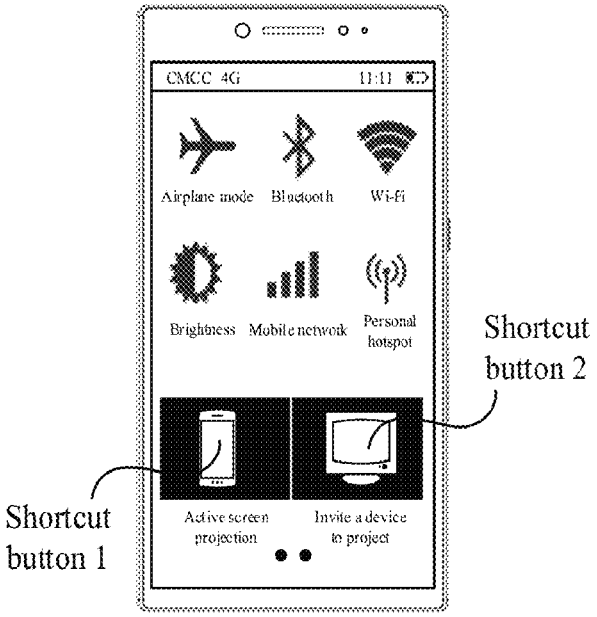
FIG. 18 is a ninth schematic diagram of an application scenario of a display method according to an embodiment of the present invention.

For another example, the user may also actively project the display interface of the mobile phone onto the display screen of the smart television. For example, as shown in FIG. 18, a shortcut button 1 of an active screen projection function may be set in a drop-up menu or a drop-down menu of the mobile phone. In this case, when the mobile phone is making a video call, the user may directly tap the shortcut button 1 in the drop-up menu or the drop-down menu, to trigger the mobile phone to display, in a current display interface, a list of projected devices that can currently receive the display data. Further, if the user selects the smart television as the projected device, the mobile phone may send, to the smart television, display data in a video call interface displayed by the mobile phone. In this way, the user can use, on the smart television with a larger screen, a video call function provided by the mobile phone.

It can be learned that in the embodiments of this application, the user may select any two devices in the device group 200 as the controlling device and the controlled device, and project the display interface of the controlled device into the display interface of the controlling device, so that the running status of the controlled device can be managed by performing a related operation in the display interface of the controlling device. In addition, when the controlling device and the controlled device establish the trust relationship, the controlling device and the controlled device each have sent, to the other device, the screen projection parameter when performing the screen projection function. In other words, the controlling device and the controlled device each learn of in advance the screen projection capability of the other device when performing the screen projection function. Therefore, the controlling device may select, based on the screen projection parameter of the controlled device, a specific screen projection manner consistent with the screen projection capability of the controlled device, to implement the screen projection function, so that efficiency of screen projection is higher, and a data delay during the screen projection is reduced.

Certainly, in the foregoing embodiments, an example in which the mobile phone 100 projects the display interface of the mobile phone 100 onto the smart television, so that the smart television manages the mobile phone 100 is used only for description. It may be understood that, any device in the device group 200 may trigger, based on a user requirement, another device to project a display interface of the another device onto the controlling device.

Figure 17:
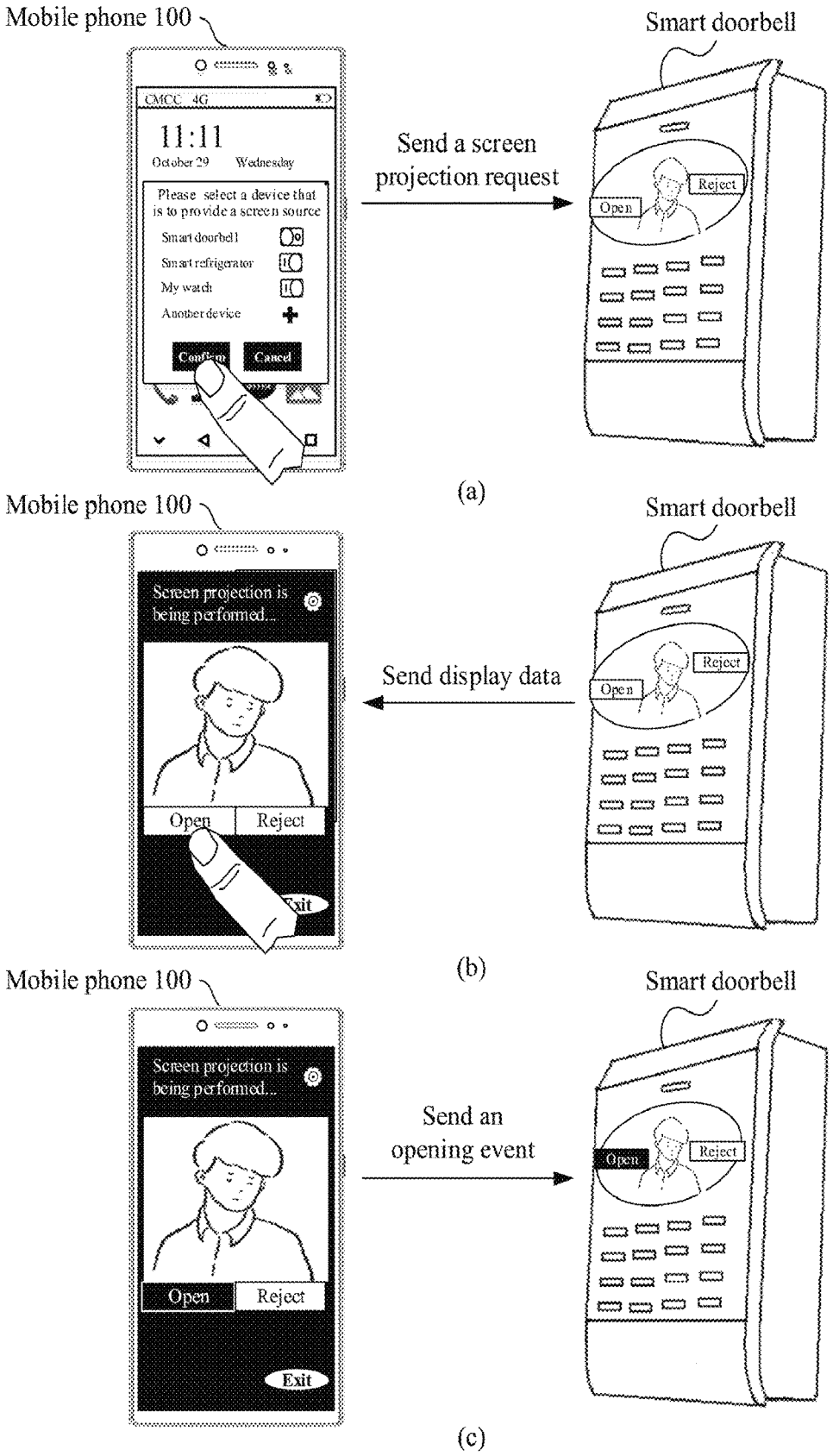
FIG. 17 is an eighth schematic diagram of an application scenario of a display method according to an embodiment of the present invention.

For example, when a visitor visits and triggers a smart doorbell, the smart doorbell may open a camera to obtain a real-time image of the visitor out of a door, and display the real-time image in an indoor display screen of the smart doorbell. In this case, as shown in (a) in FIG. 17, the user may send a screen projection request to the smart doorbell by using the mobile phone 100, to be specific, request the smart doorbell to project a current display interface into the display interface of the mobile phone 100. Further, as shown in (b) in FIG. 17, the smart doorbell receiving the screen projection request may enable a screen projection service process, to send display data in the display interface of the smart doorbell to the mobile phone 100, so that the mobile phone 100 may display the display interface of the smart doorbell in the display interface of the mobile phone 100. In this case, as shown in (c) in FIG. 17, the user may execute an opening event or a rejection event on the mobile phone 100, and the mobile phone 100 sends the operation event of the user to the smart doorbell, so that a running status of the smart doorbell is controlled by using the mobile phone 100.

For another example, still as shown in FIG. 18, a shortcut button 2 used to invite another device in the device group to project a screen of the another device onto the display screen of the mobile phone may be set in the drop-up menu or the drop-down menu of the mobile phone. In this case, when the mobile phone detects that the user taps the shortcut button 2, the mobile phone may be triggered to display, to the user, a list of devices that can currently provide screen display data (that is, a screen source). For example, the list includes a smart television 1 in a master bedroom, a smart television 2 in a children's room, and a notebook computer. In this case, the user may select a required device from the list as the controlled device. For example, the smart television 2 in the children's room is used as the controlled device, and the mobile phone is triggered to send a screen projection request to the smart television 2, so that the smart television 2 sends display data in a current display interface (for example, cartoon that is played) of the smart television 2 to the mobile phone. In this way, the user can view a running status of another device in the device group by using the mobile phone.

Similarly, the user may further trigger, on the mobile phone, an operation event for the display interface of the smart television 2. For example, the user taps a pause button or taps a close button. The mobile phone sends, to the smart television 2, a pause instruction corresponding to tapping of the pause button, to control a running status of the smart television 2.

Certainly, a tablet computer in the device group 200 may also be used as the controlling device, and triggers, by sending a screen projection request, the mobile phone 100 to project the display interface of the mobile phone 100 into a display interface of the tablet computer for management. The mobile phone 100 may be used as the controlling device, and triggers, by sending a screen projection request, an air conditioner to project a display interface of the air conditioner into the display interface of the mobile phone 100, to help the user manage a working mode and a function such as temperature setting of the air conditioner. This is not limited in this embodiment of the present invention.

It may be understood that, to achieve the foregoing functions, the foregoing device includes a corresponding hardware structure and/or software module for implementing each function. A person of ordinary skill in the art should easily be aware that, in combination with units, algorithms, and steps in the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. In an actual implementation, another division manner may be used.

Figure 19:
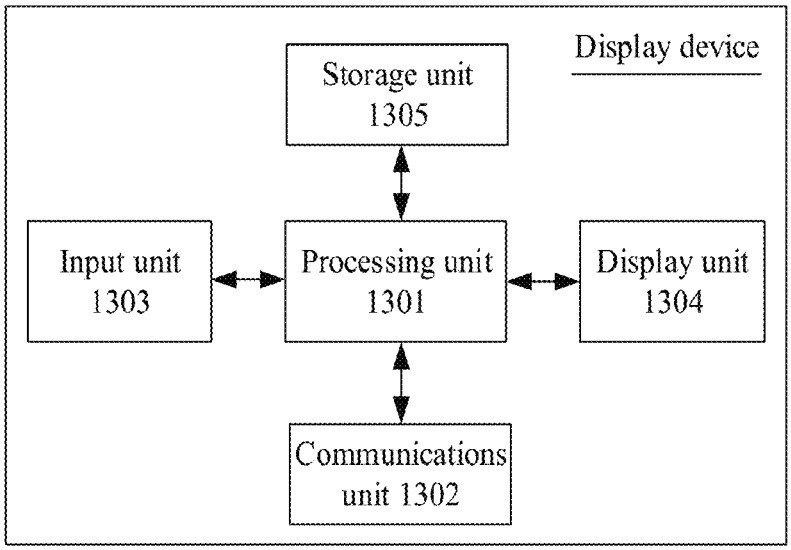
FIG. 19 is a second schematic structural diagram of a device in a device group according to an embodiment of the present invention.

When an integrated unit is used, FIG. 19 is a possible schematic structural diagram of any device (for example, the first device) in the device group in the foregoing embodiments. The device includes: a processing unit 1301, a communications unit 1302, an input unit 1303, a display unit 1304, and a storage unit 1305.

The processing unit 1301 is configured to control and manage an action of the device. For example, the processing unit 1301 may be a processor or a controller, such as a central processing unit (CPU), a GPU, a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communications unit 1302 may be configured to support the device in communicating with another network entity. For example, the communications unit 1302 may be a transceiver, a transceiver circuit, an input/output device, a peripheral interface, a Bluetooth module, a Wi-Fi module, or the like.

The input unit 1303 is configured to receive user's input, for example, a voice made by a user or a gesture executed by a user on the device. For example, the input unit 1303 may be a microphone, a touchscreen, one or more sensors, or the like.

The display unit 1304 is configured to display information that is entered by the user or information provided for the user, and various menus of the device. For example, the display unit 1304 may be a display implemented in a form of a liquid crystal display, an organic light emitting diode, or the like. In addition, a touchpad may be integrated on the display, and is configured to: collect a touch event on or near the touchpad, and send collected touch information to another component (for example, a processor).

The storage unit 1305 is configured to store program code and data of the device. For example, the storage unit 1305 may be a high-speed random access memory (RAM), or may include a non-volatile memory such as a magnetic disk storage device, a flash memory device, or another volatile solid-state storage device.

When the processing unit 1301 is a processor, the communications unit 1302 is an RF transceiver circuit, a Wi-Fi apparatus, or a Bluetooth apparatus, the input unit 1303 is a touchscreen, the display unit 1304 is a display, and the storage module 1305 is a memory, the display device provided in the embodiments of the present invention may be the mobile phone 100 shown in FIG. 2.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A device operating as a first device, comprising a processor, a memory, a display, a transceiver, and an input device that are connected by using a bus, wherein the processor is configured to enable the first device to join a device group, wherein the having N devices, wherein any two devices in the N devices can communicate with each other, and N≥2;

the input device is configured to receive a first selection operation entered by a user, wherein the first selection operation is used to trigger the first device to send a first screen projection request to a second device in the device group, wherein the first screen projection request is used to request to project a display interface of the second device onto a display screen of the first device;

the transceiver is configured to: [before the second device enters a sleeping state, receive a second probe message sent by the second device, wherein the second probe message is used to probe whether a device in the device group has a screen projection requirement; and] send a [probe response] *message* to the second device to keep a service process used to receive the first screen projection request after the second device enters the sleeping state*, the service process being used to receive a screen projection request when the second device is in the sleeping state*;

send the first screen projection request to the second device;

[and] receive display data in the display interface of the second device that is sent by the second device *when the second device is performing the service process in a screen-off state*; and the display is configured to display the display interface of the second device on the display screen of the first device based on the display data.

2. The device according to claim 1, wherein the transceiver is further configured to obtain an identifier of the second device, to establish a trust relationship with the second device.

[3. The device according to claim 2, wherein the transceiver is configured to: send a first probe message to X devices in the device group, to indicate that the first device joins the device group, the X devices including the second device, and 1≤X≤N; and receive a first trust request sent by Y devices in the device group, wherein the first trust request is used to request to establish a trust relationship with the first device, the first trust request carries an identifier of a device that sends the first trust request, the Y devices comprise the second device, and 1≤Y≤X;

the display is further configured to display a device list of the Y devices;

the input device is further configured to receive a second selection operation for selecting the second device from the device list by the user; and the memory is configured to store the identifier of the second device, to establish the trust relationship with the second device.]

[4. The device according to claim 2, wherein the transceiver is configured to: send a second trust request to X devices in the device group, to request to establish a trust relationship with a device that receives the second trust request, the X devices including the second device, and 1≤X≤N; and receive a trust response sent by Y devices in the device group, wherein the trust response carries an identifier of a device that sends the trust response, the Y devices comprise the second device, and 1≤Y≤X; and the memory is configured to store the identifier of the second device, to establish the trust relationship with the second device.]

5. The device according to claim [3] *1*, wherein [the] *a* first trust request further carries a screen projection parameter of the second device, and the screen projection parameter is used to indicate a screen projection capability of the second device when the second device performs a screen projection function.

6. The device according to claim [4] *1*, wherein [the] *a* second trust request further carries a screen projection parameter of the first device, and the screen projection parameter is used to indicate a screen projection capability of the first device when the first device performs a screen projection function.

[7. The device according to claim 1, wherein the transceiver is further configured to: send a third probe message to X devices in the device group, wherein the third probe message is used to probe whether a device that receives the third probe message keeps a service process used to receive a screen projection request, and 1≤X≤N; and receive a probe response sent by Y devices, wherein 1≤Y≤X; and the display is further configured to display a device list of the Y devices.]

8. The device according to claim 1, wherein the transceiver is further configured to: receive a second screen projection request sent by the second device, wherein the second screen projection request is used to request to project a display interface of the first device onto a display screen of the second device; and send display data in the display interface of the first device to the second device, so that the second device displays the display interface of the first device on the display screen of the second device based on the display data.

9. The device according to claim 1, wherein the transceiver configured to enable the device to: access a same wireless fidelity (WiFi) network with the second device; or access a same local area network with the second device; or access the Internet with the second device.

10. The device according to claim 1, wherein the display data in the display interface of the second device comprises display data of a last frame before the second device enters the sleeping state; or the display data in the display interface of the second device comprises display data in a display interface currently displayed by the second device; or the display data in the display interface of the second another device comprises display data in a display interface preset by the second device.

11. The device according to claim 1, wherein the input device is further configured to receive an operation event that is triggered for the display interface of the second device by the user on the display screen of the first device; and the transceiver is further configured to send an operation instruction associated with the operation event to the second device, so that the second device executes the operation instruction.

12. The device according to claim 11, wherein the transceiver is further configured to receive a voice signal sent by the second device; and the processor is further configured to play a corresponding voice based on the voice signal.

13. The device according to claim 11, wherein the operation instruction comprises: coordinate information of the operation event on the display screen of the second device, or coordinate information of the operation event on the display screen of the first device and a coordinate mapping relationship between the display screen of the first device and the display screen of the second device.

*14. The device according to claim 1, wherein the transceiver is further configured to: before the second device enters a sleeping state, receive a second probe message sent by the second device, wherein the second probe message is used to probe whether a device in the device group has a screen projection requirement.*

*15. A display method, comprising:*

*joining, by a first device, a device group, wherein the device group comprises N devices, any two devices in the N devices can communicate with each other, and N≥2;*

*receiving, by the first device, a first selection operation entered by a user;*

*in response to the first selection operation, sending, by the first device, a first screen projection request to a second device to request to project a display interface of the second device onto a display screen of the first device;*

*receiving, by the first device, display data in the display interface of the second device from the second device when the second device is performing a service process in a screen-off state; and*

*displaying, by the first device, the display interface of the second device on the display screen of the first device based on the display data,*

*wherein the service process is used to receive the first screen projection request and is maintained by the second device after the second device has entered a sleeping state, the service process being used to receive a screen projection request when the second device is in the sleeping state.*

*16. The method according to claim 15, further comprising:*

*obtaining, by the first device, an identifier of the second device to establish a trust relationship with the second device.*

*17. The method according to claim 15, wherein the device group comprises the second device, and the joining, by a first device, a device group comprises:*

*accessing, by the first device, a same wireless fidelity (WiFi) network with the second device;*

*accessing, by the first device, a same local area network with the second device; or*

*accessing, by the first device, the Internet with the second device.*

*18. The method according to claim 15, wherein the display data in the display interface of the second device comprises:*

*display data of a last frame before the second device enters the sleeping state; or*

*display data in a display interface currently displayed by the second device; or*

*display data in a display interface preset by the second device.*

*19. The method according to claim 15, further comprising:*

*receiving, by the first device, an operation event that is triggered for the display interface of the second device by the user on the display screen of the first device; and*

*sending, by the first device, an operation instruction associated with the operation event to the second device, so that the second device executes the operation instruction.*

*20. A system comprising a first device and a second device, wherein the first device comprises a processor, a memory, a display, a transceiver, and an input device that are connected by using a bus, wherein*

*the processor is configured to enable the first device to join a device group, wherein the device group comprises N devices, any two devices in the N devices can communicate with each other, the N devices comprises the second device, and N≥2;*

*the input device is configured to receive a first selection operation entered by a user, wherein the first selection operation is used to trigger the first device to send a first screen projection request to the second device;*

*the transceiver is configured to:*

*send a first screen projection request to the second device, wherein the first screen projection request is used to request to project a display interface of the second device onto a display screen of the first device; and*

*receive display data in a display interface of the first device that is sent by the second device when the second device is performing a service process in a screen-off state; and*

*the display is configured to display the display interface of the second device on the display screen of the first device based on the display data;*

*wherein the service process is used to receive the first screen projection request and is maintained by the second device after the second device has entered a sleeping state, the service process being used to receive a screen projection request when the second device is in the sleeping state.*

*21. The system according to claim 20, wherein the transceiver is further configured to obtain an identifier of the second device to establish a trust relationship with the second device.*

*22. The system according to claim 20, wherein the transceiver is further configured to enable the first device to:*

*access a same wireless fidelity (WiFi) network with the second device; or*

*access a same local area network with the second device; or*

*access the Internet with the second device.*

*23. The system according to claim 20, wherein the display data in the display interface of the second device comprises:*

*display data of a last frame before the second device enters the sleeping state;*

*display data in a display interface currently displayed by the second device; or*

*display data in a display interface preset by the second device.*

*24. The system according to claim 20, wherein*

*the input device is further configured to receive an operation event that is triggered for the display interface of the second device by the user on the display screen of the first device; and*

*the transceiver is further configured to send an operation instruction associated with the operation event to the second device, so that the second device executes the operation instruction.*

* * * * *